United States Patent
Verspecht et al.

(10) Patent No.: US 9,520,954 B1
(45) Date of Patent: Dec. 13, 2016

(54) METHOD AND SYSTEM FOR CHARACTERIZING PHASE DISPERSION IN INTERMEDIATE FREQUENCY CHANNEL OF RECEIVER

(71) Applicant: Keysight Technologies, Inc., Minneapolis, MN (US)

(72) Inventors: Jan Verspecht, Londerzeel (BE); Keith F. Anderson, Santa Rosa, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/009,309

(22) Filed: Jan. 28, 2016

(51) Int. Cl.
| | |
|---|---|
| H04B 17/00 | (2015.01) |
| H04B 1/16 | (2006.01) |
| H04B 17/20 | (2015.01) |
| H04B 1/26 | (2006.01) |
| H04L 7/00 | (2006.01) |

(52) U.S. Cl.
CPC ............... H04B 17/20 (2015.01); H04B 1/26 (2013.01); H04L 7/0012 (2013.01)

(58) Field of Classification Search
CPC ............. H04B 1/001; H04B 1/04; H04B 1/06; H04B 1/16; H04B 1/40; H04B 3/46; H04B 17/00; H04B 17/004; H04B 17/0085; H04B 17/19; H04B 17/20; H04B 17/29; H04B 17/101
USPC .......... 455/67.11, 67.14, 131, 307, 313, 323, 455/334, 339; 375/316, 324
See application file for complete search history.

(56) References Cited

U.S. PATENT DOCUMENTS

| | | | | |
|---|---|---|---|---|
| 6,694,129 B2* | 2/2004 | Peterzell | ................ | H03D 3/008 455/208 |
| 8,831,549 B2* | 9/2014 | Lin | ........................ | H04B 1/30 455/307 |
| 8,879,611 B2* | 11/2014 | Dhayni | ................ | H04B 17/004 375/316 |

FOREIGN PATENT DOCUMENTS

EP    1 367 402 A1    12/2003

OTHER PUBLICATIONS

Co-pending U.S. Appl. No. 14/997,084, filed Jan. 15, 2016.
Co-pending U.S. Appl. No. 15/011,306, filed Jan. 29, 2016.
Co-pending U.S. Appl. No. 15/085,702, filed Mar. 30, 2016.

* cited by examiner

*Primary Examiner* — Quochien B Vuong

(57) ABSTRACT

A system and method supply a test signal having a first tone at a first RF frequency and a second tone at a second RF frequency to a frequency converter; provide a local oscillator (LO) signal to the frequency converter, wherein an IF output signal of the frequency converter is supplied to an input of an intermediate frequency (IF) filter, in response to which the IF filter provides a filtered IF output signal; for each of N>1 different LO frequencies, measure the filtered IF output signal at a pair of IF frequencies corresponding to differences between the first and second RF frequencies and the LO frequency, where the measurements of the filtered IF output signal measure time-invariant phase; and ascertain N−1 values of phase dispersion D of the IF filter at N−1 corresponding IF frequencies from the N measurements of the filtered IF output signal at the N different LO frequencies.

26 Claims, 10 Drawing Sheets

US 9,520,954 B1

METHOD AND SYSTEM FOR CHARACTERIZING PHASE DISPERSION IN INTERMEDIATE FREQUENCY CHANNEL OF RECEIVER

BACKGROUND

Frequency translating receivers, and in particular superheterodyne receivers, are widely employed in communication transceivers, test and measurement instruments, and other systems.

FIG. 1 shows a functional block diagram of a generalized example of a frequency translating receiver, in particular a superheterodyne receiver 10. Receiver 10 includes a radio frequency (RF) front end section 2, a frequency converter 4, an intermediate frequency (IF) filter section 6, a demodulator 8, and a baseband amplifier 9.

In the example receiver 10, RF front end section 2 includes an RF filter (sometimes called a preselector) 11 and an RF amplifier 12. Frequency converter 4 includes a local oscillator (LO) 13, a LO filter 14, and a mixer 15. IF filter section 6 includes an IF filter 16 and an IF amplifier 17.

It should be understood that many elements shown in FIG. 1 may be omitted in other embodiments. For example, in other embodiments one or both components of RF front end section 2 may be omitted, LO filter 14 may be omitted, IF filter 16 and IF amplifier 17 may be combined, and/or IF amplifier 17 may be omitted. In some embodiments, the output of IF filter section 6 may be digitized by an analog-to-digital converter (ADC) and demodulation may be performed digitally, for example by a digital signal processor (DSP). In that case, demodulator 8 and baseband amplifier 9 may be replaced by an ADC and a DSP. Many variations are common.

In operation, receiver 10 receives an RF input signal RF IN at an input terminal or input port 1, and outputs a baseband output signal (e.g., digital data) at an output port 3. The details of the operation of a superheterodyne receiver such as receiver 10 is very well known to those skilled in the art, and in the interest of brevity will not be explained here.

In many situations, it is desired to be able to efficiently and accurately characterize the IF response of a frequency translating receiver such as receiver 10. In particular, in some cases it may be desired to efficiently and accurately characterize the IF phase dispersion characteristics of a frequency translating receiver such as receiver 10. For example, characterization of the IF phase dispersion may be necessary for a signal analyzer in order to make accurate vector signal analyzer measurements, e.g., to measure error-vector-magnitude (EVM). Here, given a frequency range defined by a lower IF frequency and an upper IF frequency, the phase dispersion of an IF channel over the given frequency range is defined as the deviation of the phase of the IF channel at the middle of the frequency range, from the average phase over the frequency range between the lower and upper IF frequency.

Thus it would be desirable to provide a method and system to characterize the IF phase dispersion characteristics of a frequency translating receiver, in particular a superheterodyne receiver.

SUMMARY

According to one aspect of the invention, a method comprises: generating a test signal having a first tone at a first RF frequency and a second tone at a second RF frequency; using a local oscillator (LO) signal to convert the test signal to an intermediate frequency (IF) signal; filtering the IF signal with an IF filter to produce a filtered IF output signal; setting the LO signal to a first LO frequency; measuring the filtered IF output signal at first and second IF frequencies while the LO signal is set to the first LO frequency, wherein the first IF frequency is a difference between the second RF frequency and the first LO frequency, and the second IF frequency is a difference between the first RF frequency and the first LO frequency; setting the LO signal to a second LO frequency, wherein a frequency difference between the second LO frequency and the first LO frequency is equal to a frequency difference $\Delta f$ between the second RF frequency and the first RF frequency of the test signal; measuring the filtered IF output signal at the second IF frequency and at a third IF frequency while the LO signal is set to the second LO frequency, wherein the third IF frequency is a difference between the first RF frequency and the second LO frequency; and ascertaining a value D of a phase dispersion of the IF filter at the second IF frequency from the measurements of the filtered IF output signal, where the measurements of the filtered IF output signal measure time-invariant phase.

In some embodiments, measuring the filtered IF output signal includes: measuring a phasor M1[1] of the filtered IF output signal at the second IF frequency while the LO signal is set to the first LO frequency, measuring a phasor M2[1] of the filtered IF output signal at the first IF frequency while the LO signal is set to the first LO frequency, measuring a phasor M1[2] of the filtered IF output signal at the third IF frequency while the LO signal is set to the second LO frequency, and measuring a phasor M2[2] of the filtered IF output signal at the second IF frequency while the LO signal is set to the second LO frequency; and ascertaining the value D of the phase dispersion of the IF filter at the second IF frequency comprises ascertaining $$D = \frac{1}{2}\varphi\left(\frac{M1[1] \cdot M2[2]}{M2[1] \cdot M1[1]}\right),$$

where $\varphi(x)$ is a phase of x.

In some embodiments, the method further comprises measuring the filtered IF output signal at a plurality of additional IF frequencies for a plurality of first RF frequencies, second RF frequencies, LO frequencies, and frequency differences $\Delta f$, and ascertaining a phase dispersion characteristic of the IF filter as a function of IF frequency from the measurements of the filtered IF output signal.

In some embodiments, measuring the filtered IF output signal includes: digitizing the filtered IF output with an analog-to-digital converter (ADC) to produce digital data; and applying a discrete Fourier transform to the digital data to obtain a digital representation of the filtered IF output signal as a function of frequency.

In some versions of these embodiments, the first RF frequency, second RF frequency, first LO frequency, second LO frequency, and the ADC are all synchronized to a common reference clock.

In some versions of these embodiments, the method further comprises: providing a phase slope reference signal, the phase slope reference signal synchronized to the first and second RF frequencies and having a frequency equal to a difference between the first and second RF frequencies; ascertaining phases of the phase slope reference signal corresponding to the times when measuring the filtered IF output signal at the first and second IF frequencies while the LO signal is set to the first LO frequency and corresponding to the times when measuring the filtered IF output at the second IF frequency and at a third IF frequency while the LO signal is set to the second LO frequency; and adjusting the measurements of the filtered IF output signal by the ascertained phases of the phase slope reference signal.

In some embodiments, using the local oscillator (LO) signal to convert the test signal to an intermediate frequency (IF) signal comprises: supplying the test signal to an RF filter; and supplying the LO signal and an output of the RF filter and to a mixer.

In some embodiments, the test signal further has a third RF frequency, and the method further comprises: measuring the filtered IF output signal at the third IF frequency while the LO signal is set to the first LO frequency; measuring the filtered IF output at the a fourth IF frequency while the LO signal is set to the second LO frequency; and ascertaining a phase dispersion of the IF filter at the third IF frequency from the measurements of the filtered IF output signal.

In some embodiments, generating the test signal having the first tone at the first RF frequency and the second tone at the second RF frequency comprises generating a pulsed RF signal having at least the first tone and the second tone.

According to another aspect of the invention, a system comprises: an RF signal generator configured to produce a test signal having a first tone at a first RF frequency and a second tone at a second RF frequency and further configured to supply the test signal to a superheterodyne receiver, the superheterodyne receiver also receiving a local oscillator (LO) signal and in response to the test signal and the LO signal supplying an intermediate signal (IF) output signal to an input of an IF filter, in response to which the IF filter outputs a filtered IF output signal; an IF signal processor configured to process the filtered IF signal; and a controller. The controller is configured to control the system to: set the LO signal to a first LO frequency; measure the filtered IF output signal at first and second IF frequencies while the LO signal is set to the first LO frequency; set the LO signal to a second LO frequency, wherein a frequency difference between the second LO frequency and the first LO frequency is equal to a frequency difference $\Delta f$ between the second RF frequency and the first RF frequency of the test signal; measure the filtered IF output at the second IF frequency and at a third IF frequency while the LO signal is set to the second LO frequency, where the third IF frequency is a difference between the first RF frequency and the second LO frequency; and ascertain a value D of a phase dispersion of the IF filter at the second IF frequency from the measurements of the filtered IF output signal, where the measurements of the filtered IF output signal measure time-invariant phase.

In some embodiments, measuring the filtered IF output signal includes: measuring a phasor M1[1] of the filtered IF output signal at the second IF frequency while the LO signal is set to the first LO frequency, measuring a phasor M2[1] of the filtered IF output signal at the first IF frequency while the LO signal is set to the first LO frequency, measuring a phasor M1[2] of the filtered IF output signal at the third IF frequency while the LO signal is set to the second LO frequency, and measuring a phasor M2[2] of the filtered IF output signal at the second IF frequency while the LO signal is set to the second LO frequency; wherein ascertaining the phase dispersion D of the IF filter at the second IF frequency comprises ascertaining $$D = \frac{1}{2}\varphi\left(\frac{M1[1]\cdot M2[2]}{M2[1]\cdot M1[1]}\right),$$

where $\varphi(x)$ is a phase of x.

In some versions of these embodiments, the controller is further configured to control the RF generator to adjust the first and second RF frequencies and to control the LO to adjust the LO frequencies, and to measure the filtered IF output signal at a plurality of additional IF frequencies for a corresponding plurality of first RF frequencies, second RF frequencies, LO frequencies, and frequency differences $\Delta f$, and to ascertain a phase dispersion characteristic of the IF filter as a function of IF frequency from the measurements of the filtered IF output signal.

In some versions of these embodiments, the IF signal processor includes: an analog-to-digital-converter (ADC) configured to digitize the filtered IF signal to produce digital data; and a digital-signal-processor configured to apply a discrete Fourier transform to the digital data to obtain a digital representation of the filtered IF output signal as a function of frequency, and to process the digital representation of the filtered IF output signal as a function of frequency to measure the filtered IF output signal.

In some versions of these embodiments, the first RF frequency, second RF frequency, first LO frequency, second LO frequency, and the ADC are all synchronized to a common reference clock.

In some versions of these embodiments, the system further comprises a phase slope reference signal generator configured to generate a phase slope reference signal synchronized to the first and second RF frequencies and having a frequency equal to a difference between the first and second RF frequencies, wherein the controller is configured to control the system to ascertain phases of the phase slope reference signal corresponding to the times when measuring the filtered IF output signal at the first and second IF frequencies while the LO signal is set to the first LO frequency and corresponding to the times when measuring the filtered IF output at the second IF frequency and at a third IF frequency while the LO signal is set to the second LO frequency, and to adjust the measurements of the filtered IF output signal by the ascertained phases of the phase slope reference signal.

In some versions of these embodiments, the phase slope reference signal generator comprises a numerically controlled oscillator (NCO).

In some versions of these embodiments, the test signal further has a third tone at a third RF frequency, wherein the controller is further configured to control the system to: measure the filtered IF output signal at the third IF frequency while the LO signal is set to the first LO frequency; measure the filtered IF output at a fourth IF frequency while the LO signal is set to the second LO frequency; and ascertain a phase dispersion of the IF filter at the third IF frequency from the measurements of the filtered IF output signal.

In some embodiments, the RF signal generator comprises a pulse modulated signal generator generating a pulsed RF signal having at least the first tone and the second tone.

According to still another aspect of the invention, a method comprises: supplying a test signal having a first tone at a first RF frequency and a second tone at a second RF frequency to a frequency converter; controlling a local oscillator (LO) frequency of an LO signal provided to the frequency converter, wherein an IF output signal of the frequency converter is supplied to an input of an intermediate frequency (IF) filter, in response to which the IF filter provides a filtered IF output signal; for each of N>1 different LO frequencies, measuring the filtered IF output signal at a pair of IF frequencies corresponding to differences between the first and second RF frequencies and the LO frequency, where the measurements of the filtered IF output signal measure time-invariant phase; and ascertaining N−1 values of a phase dispersion response of the IF filter at N−1 corresponding IF frequencies from the N measurements of the filtered IF output signal at the N different LO frequencies.

In some embodiments, measuring the filtered IF output signal includes: measuring a phasor M1[1] of the filtered IF output signal at the second IF frequency while the LO signal is set to a first LO frequency, measuring a phasor M2[1] of the filtered IF output signal at the first IF frequency while the LO signal is set to the first LO frequency, measuring a phasor M1[2] of the filtered IF output signal at the third IF frequency while the LO signal is set to a second LO frequency, and measuring a phasor M2[2] of the filtered IF output signal at the second IF frequency while the LO signal is set to the second LO frequency; wherein ascertaining the phase dispersion D of the IF filter at the second IF frequency comprises ascertaining $$D = \frac{1}{2}\varphi\left(\frac{M1[1] \cdot M2[2]}{M2[1] \cdot M1[1]}\right),$$

where $\varphi(x)$ is a phase of x.

In some embodiments, measuring the filtered IF output signal includes: digitizing the filtered IF output with an analog-to-digital converter (ADC) to produce digital data; and applying a discrete Fourier transform to the digital data to obtain a digital representation of the filtered IF output signal as a function of frequency, wherein the first RF frequency, second RF frequency, first LO frequency, second LO frequency, and the ADC are all synchronized to a common reference clock.

In some embodiments, the test signal further has a third RF frequency, and the method further comprises: for each of N>1 different LO frequencies, measuring the filtered IF output signal at a third IF frequency corresponding to a difference between the third RF frequency and the LO frequency; and ascertaining an Nth value of phase dispersion D of the IF filter an Nth IF frequency from the N measurements of the filtered IF output signal at the N different LO frequencies.

In some embodiments, supplying to the frequency converter the test signal having the first tone at the first RF frequency and the second tone at the second RF frequency comprises generating a pulsed RF signal having at least the first tone and the second tone.

According to yet another aspect of the invention, a method comprises: supplying a first signal to a first input of a frequency converter and supplying a second signal to a second input of the frequency converter, wherein an intermediate frequency (IF) output signal of the frequency converter is supplied to an input of an IF filter, in response to which the IF filter provides a filtered IF output signal; setting the first signal to a first frequency and the second signal to a second frequency, and measuring a first instantaneous phase the filtered IF output signal at a first IF frequency corresponding to a difference between the first frequency and second frequency; changing the first signal to a third frequency while leaving the second signal at the second frequency, and measuring a second instantaneous phase of the filtered IF output signal at a second IF frequency corresponding to a difference between the third frequency and the second frequency; changing the second signal to a fourth frequency while leaving the first signal at the third frequency, and measuring a third instantaneous phase of the filtered IF output signal at a third IF frequency corresponding to a difference between the third frequency and the fourth frequency; changing the first signal to the first frequency while leaving the second signal at the fourth frequency, and measuring a fourth instantaneous phase of the filtered IF output signal at the second IF frequency corresponding to the difference between the third frequency and the second frequency, wherein a phase of the first signal is controlled to be the same while measuring the fourth instantaneous phase of the filtered IF output signal as a phase of the first signal while measuring the first instantaneous phase of the filtered IF output signal; and combining the measured first instantaneous phase of the filtered IF output signal, the measured second instantaneous phase of the filtered IF output signal, the measured third instantaneous phase of the filtered IF output signal, and the measured fourth instantaneous phase of the filtered IF output signal, and normalizing the instantaneous phase of the filtered IF output signal at the first IF frequency and at the third IF frequency, to obtain a phase dispersion of the IF filter at the second IF frequency.

In some embodiments, the frequency converter comprises a mixer having a radio frequency (RF) input port and a local oscillator (LO) input port, wherein the first signal is applied to the RF input port, and the second signal is applied to the LO input port.

In some embodiments, the frequency converter comprises a mixer having a radio frequency (RF) input port and a local oscillator (LO) input port, wherein the first signal is applied to the LO input port, and the second signal is applied to the RF input port.

BRIEF DESCRIPTION OF THE DRAWINGS

The example embodiments are best understood from the following detailed description when read with the accompanying drawing figures. In fact, the dimensions may be arbitrarily increased or decreased for clarity of discussion. Wherever applicable and practical, like reference numerals refer to like elements.

DETAILED DESCRIPTION

Figure 1:
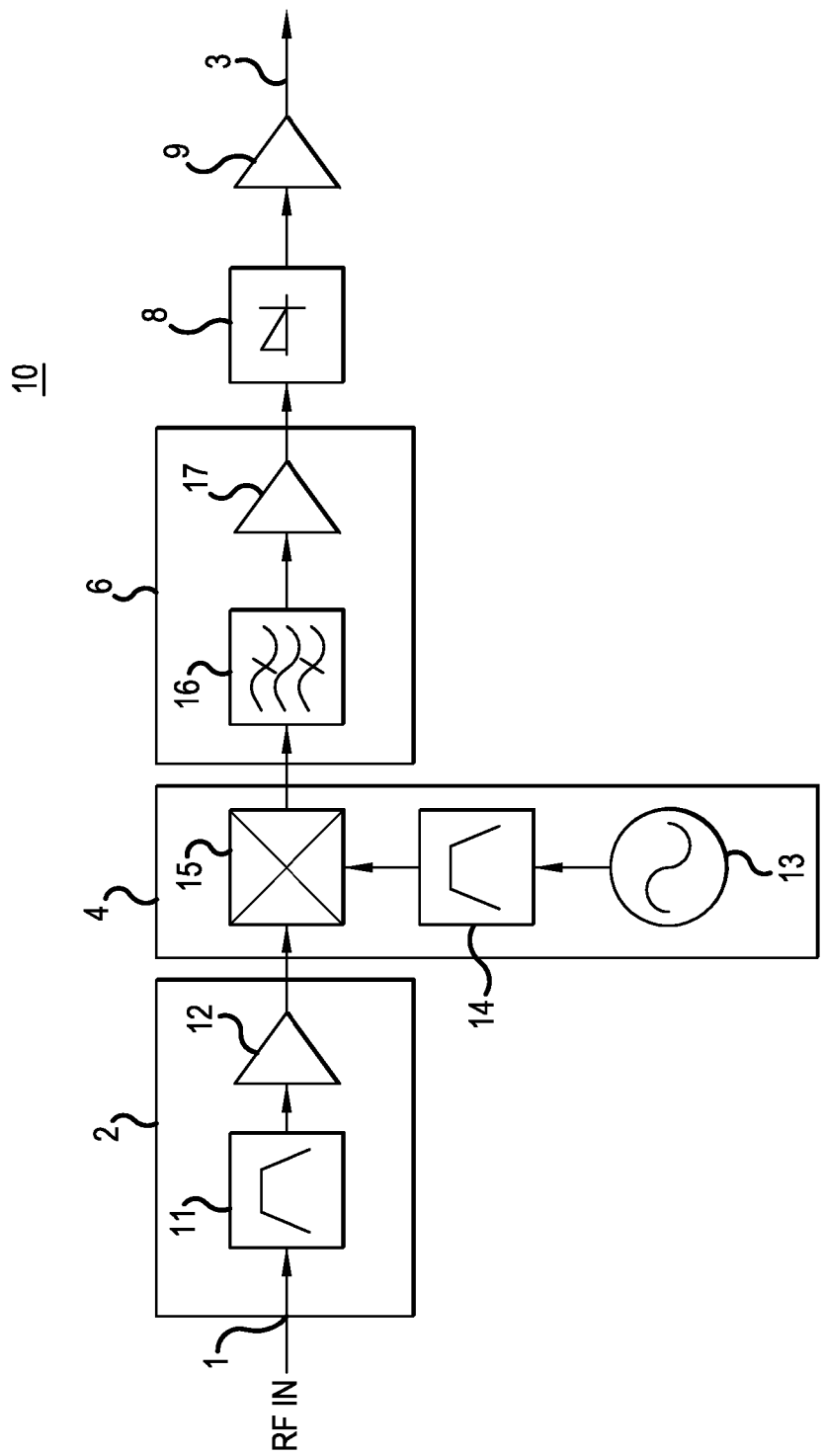
FIG. 1 shows a functional block diagram of a frequency translating receiver.

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

As noted above, in some cases it is desired to be able to provide a system and method which can characterize, or calibrate, the intermediate frequency (IF) phase dispersion characteristic of a frequency translating receiver in an efficient and accurate manner.

Accordingly, an explanation of phase dispersion will now be provided.

For a sinusoidal signal described as:

$$v_1(t) = A_1 * \text{COS}(\omega_1 * t + \theta_1) \tag{1}$$

where the system time=t, the instantaneous phase of the signal, $\Phi_1(t)$, is:

$$\Phi_1 = \omega_1 * t + \theta_1, \tag{2}$$

And the time-zero phase, $\Phi_1(0)$, is:

$$\Phi_1(0) = \theta_1 \tag{3}$$

Now consider a multi-tone signal consisting of many sinusoids:

$$v_N(t) = A1 * \text{COS}(\omega 1 t + \theta 1) + A2 * \text{COS}(\omega 2 t + \theta 2) + A3 * \text{COS}(\omega 3 t + \theta 3) + \ldots \tag{4}$$

In particular, assume that the tones are equally spaced in frequency by $\Delta\omega$, such that $\omega_n = \omega_{n-1} + \Delta\omega$. In that case, we define the instantaneous phase of each component, $A_n * \text{COS}(w_n t + \theta_n)$ as:

$$\Phi n(t) = \omega n t + \theta n \tag{5}$$

Figure 2:
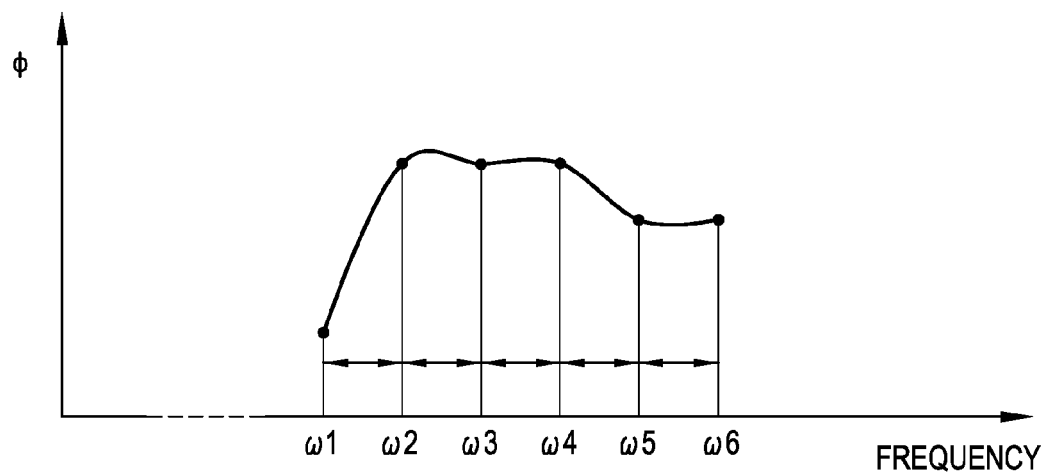
FIG. 2 illustrates a phase response of an example multi-tone signal.

FIG. 2 illustrates a phase response of a example multi-tone signal with six frequency tones.

To characterize this signal in the frequency domain one needs to know the magnitude and phase of each frequency tone. For a stationary signal, the magnitudes are constant versus time. However, the phases change versus time. For example, from Equation (5): $\Phi_1(t) = \omega_1 t + \theta_1$; $\Phi_2(t) = \omega_2 t + \theta_2$, etc.

Not only does the phase of each frequency tone change versus time, but also the relative phase between signals changes versus time. For example, $$\Phi_2 - \Phi_1 = (\omega_2 t + \theta_2) - (\omega_1 t + \theta_1) = \Delta\omega t + \theta_2 - \theta_1 \tag{6}$$

And in particular, the phase difference between the two signals at time $t_1$, $\Delta\Phi(t_1)$, is given by:

$$\Delta\Phi(t_1) = [\Phi_2(t_1) - \Phi_1(t_1)] = (\omega_2 * t_1 + \theta_2) - (\omega_1 * t_1 + \theta_1) = (\omega_2 - \omega_1) * t_1 + (\theta_2 - \theta_1) \tag{7}$$

We would like to describe the phase of the multi-tone signal $v_N(t)$ in a way that is independent of the measurement time. This may be achieved by normalizing the phase offset and the phase slope of the signal. Some examples of values which may be used for normalizing the phase offset are: phase of the first frequency tone, phase of the middle point, phase of the last frequency tone, and the average phase. Some examples of values which may be used for normalizing the phase slope are: the average phase slope and the least-mean-squared fit phase slope.

Figures 3A, 3B, 3C:
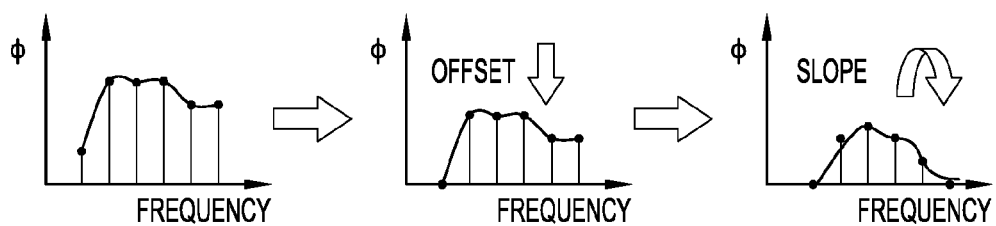
FIGS. 3A, 3B, and 3C illustrate an example of a phase normalization process for a multi-tone signal.

FIGS. 3A-3C illustrate an example of a phase normalization process for a multi-tone signal. The transition from FIG. 3A to FIG. 3B involves normalizing the phase offset by offsetting all phases of all tones such that the first frequency has a zero phase. The transition from FIG. 3B to FIG. 3C involves normalizing the phase slope such that the last frequency has zero phase (which is equivalent to normalizing to the average slope).

Now, if we assume that a multi-tone input signal to a device under test has a linear phase characteristic as a function frequency, then the phase dispersion of the device may be obtained by measuring the normalized phase slope of the output signal of the device as described with respect to FIGS. 3A-3C. Furthermore, if the multi-tone input signal has a non-linear phase characteristic as a function frequency, then the phase dispersion may be obtained if the non-linear characteristic is known and can therefore be factored out of the normalized phase slope of the output signal of the device.

One way of characterizing or measuring the phase dispersion characteristics of a mixer or intermediate frequency (IF) channel of a frequency translating receiver such as receiver 10 of FIG. 1 is as follows. Assume that an RF source is connected to input terminal 1. Further, assume that: the RF source is coherent with a frequency of a sampling device which is used to sample the IF; the RF response of RF front end section 2 is calibrated or known; LO 13 is also coherent with the frequency of the sampling device which is used to produce the baseband output signal; and the LO response of LO filter 14 is calibrated or known. In that case, one can calibrate the IF response by changing the RF or LO frequency by a known amount and measuring the IF output for each change in the RF or LO frequency (which produces a corresponding change in the IF frequency).

Alternatively, if only the RF source is coherent and the RF response of RF front end section 2 is calibrated or known, then the LO frequency can be fixed while the RF frequency of the coherent RF source is moved by known amounts. This produces corresponding changes in the IF frequency, and the response at each IF frequency can be measured to determine the IF response.

In yet another case, if only LO 13 is coherent and the response of LO filter 14 is calibrated or known, then the RF frequency can be fixed while the LO frequency of LO 13 is moved by known amounts. This, again produces corresponding changes in the IF frequency, and the response at each IF frequency can be measured to determine the IF response.

However, all of these "brute force" techniques for characterizing or measuring the phase dispersion of the IF channel of receiver 10 have in common a requirement that one knows (e.g. via a calibration) the phase response of the RF path and/or the LO path, including the phase characteristic of the source(s) (RF and/or LO) and the source's corresponding "filter" (or transfer function) as a function of frequency, through the mixing port of mixer 15. Such calibration can be time consuming and may not always be possible or practical.

Accordingly, described below are methods and systems for characterizing the phase dispersion characteristic of a mixer and/or IF channel of a frequency translating receiver without the need for calibrated RF channel and/or LO channel responses. In some embodiments, such systems and methods operate by making time-invariant phase measurements of the IF output for different combinations of RF and LO frequencies. There are a variety of different ways that time-invariant phase may be measured, some of which are described below, including for example, using a measuring device with a hardware trigger synchronized to the signal being measured; measuring a phase slope reference signal in parallel with the signal being measured; and using a measurement device with time-stamped measurement data.

Figure 4:
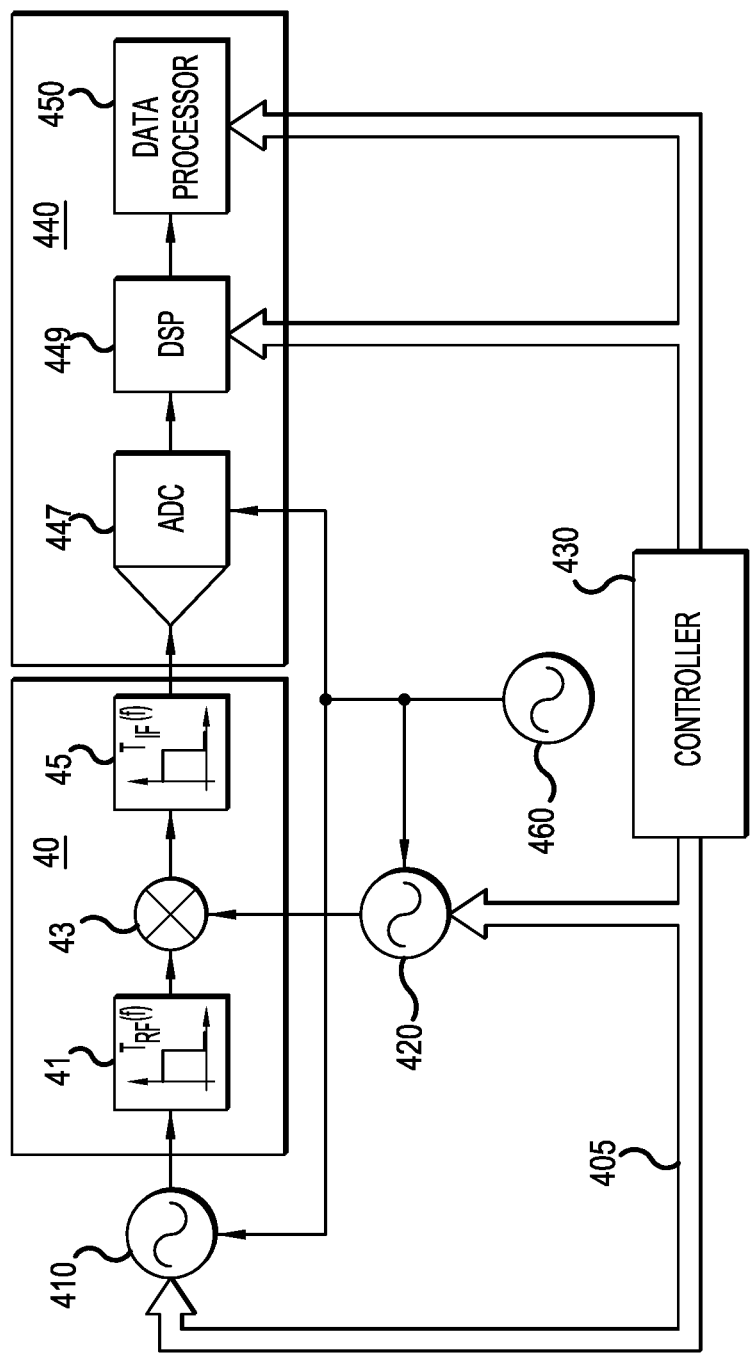
FIG. 4 shows a functional block diagram of an example embodiment of a test or measurement system for characterizing the IF phase dispersion characteristics of a device such as an IF filter of a frequency translating receiver.

FIG. 4 shows a functional block diagram of an example embodiment of a test or measurement system for characterizing the IF phase dispersion characteristics of a frequency translating receiver 40. In the example of FIG. 4, receiver 40 includes a radio frequency (RF) filter 41, a mixer 43, and an IF filter 45. Here, the test or measurement system includes a test signal generator (RF signal generator) 410, a local oscillator (LO) 420, a controller 430, an IF signal processor 440, and a reference clock 460. Here, IF signal processor 440 includes an analog-to-digital-converter 447, a digital signal processor (DSP) 449, and a data processor 450.

In some embodiments, RF signal generator 410 may include two or more frequency generators whose outputs are combined via one or more power combiners to produce an RF signal generator 410 output signal having two or more tones at two or more corresponding RF frequencies. In another embodiment, RF generator 410 may be pulse modulated to produce a pulsed RF output signal having a plurality of tones.

Controller 430 may include one or more computer processors and associated memory. The memory may include any appropriate combination or volatile memory such as random access memory (RAM) and/or non-volatile memory such as read only memory (ROM), electrically erasable programmable read only memory (EEPROM), FLASH memory, etc. The memory may store computer-readable instructions for causing controller 430 to execute one or more algorithms, including for example algorithms for controlling operations of the test or measurement system for characterizing the IF phase dispersion characteristics of frequency translating receiver 40 as described in detail below.

In some embodiments, controller 430 may have associated therewith (not shown in FIG. 4) one or more of a keypad, keyboard, a trackball, a pointing device, a mouse, a display screen, a touchscreen, etc., and may execute software code to provide a user interface via these devices whereby a user may control one or more parameters of the test or measurement system.

Controller 405 may control one or more operations of RF signal generator 410, LO 420, DSP 449, and data processor 450, for example via a communication bus 405.

In some embodiments, DSP 449 may be configured to apply a discrete Fourier transform to the digitized filtered IF data output from ADC 47, and data processor 450 may process frequency samples output by DSP 449 as discussed below.

In various implementations, DSP 449 and/or processor 450 may include one or more of hardware, firmware, and/or software, including for example one or more field programmable gate arrays (FPGAs), application specific integrated circuits (ASICs), etc for applying a discrete Fourier transform to the digitized filtered IF data output from ADC 47.

It should be noted that FIG. 4 shows a functional block diagram, so some elements may be physically combined or rearranged in various implementations. In some implementations, certain elements may be omitted or rearranged and/or other elements may be present. For example some implementations of receiver 40 may omit RF filter 41. In some cases, an RF filter may be included as part of the test or measurement system, external to receiver 40. In some implementations, IF filter 45 may include an IF amplifier. Indeed, as the term is used herein, it is understood that an "IF filter" may or may not include an IF amplifier. In some cases data processor 450 may be subsumed within DSP 449 and/or controller 430. In some embodiments, reference clock 460 may be omitted, and other means or methods of synchronization of the test or measurement system may be applied instead, as described below.

Figure 5:
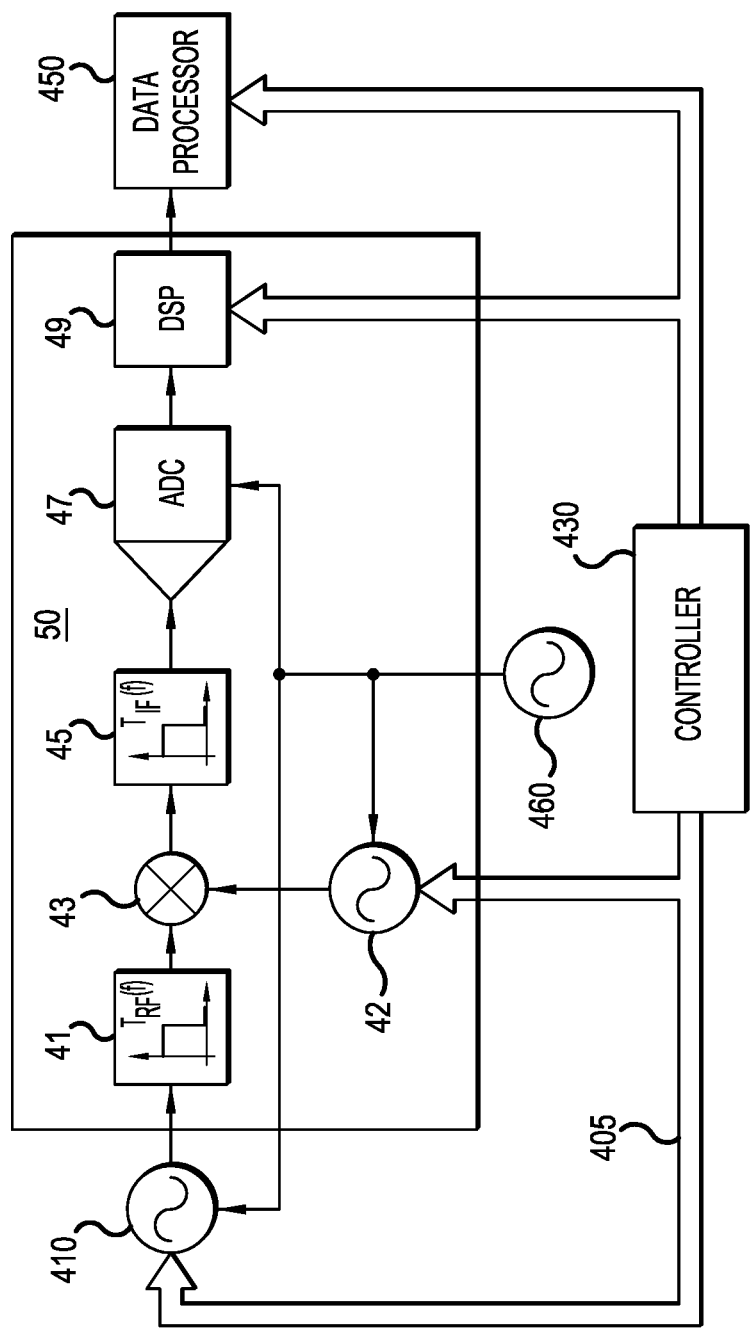
FIG. 5 shows a functional block diagram of another example embodiment of a test or measurement system for characterizing the IF phase dispersion characteristics of a device such as an IF filter of a frequency translating receiver.

FIG. 5 shows a functional block diagram of another example embodiment of a test or measurement system for characterizing the IF phase dispersion characteristics of a frequency translating receiver 50. The arrangement shown in FIG. 5 is the same as the arrangement of FIG. 4, except in FIG. 5 some elements of the test or measurement system in FIG. are included in receiver 50. In particular, receiver 50 includes local oscillator (LO) 42, ADC 47 and DSP 49. It should be understood that various other arrangements of the elements of FIGS. 4 and 5 are possible.

Example operations of the test and measurement system of FIG. 5 will now be described for characterizing the IF phase dispersion characteristics of frequency translating receiver 30, and in particular IF filter 45.

Consider a continuous wave RF signal with a frequency $f_{RF}$ applied to the input port of receiver 30. This RF signal can be represented by a complex phasor $P_{RF}$. Note that $P_{RF}$ will have both a phase and a magnitude. This signal first passes thru RF filter 41, which is a passive linear structure represented by a frequency dependent transfer function $T_{RF}(f)$, before being injected into mixer 45. A local oscillator (LO) signal, represented by a complex phasor $P_{LO}$ is injected into the LO-port of mixer 45 from LO 42. The IF signal appearing at the intermediate frequency (IF) port of mixer 43 is injected into IF filter 45, represented by a transfer function $T_{IF}(f)$. The filtered IF signal coming out of IF filter 45 is digitized by analog-to-digital converter (ADC) 47, and digital signal processor (DSP) 49 applies a discrete Fourier transform to the digitized data. This produces a measured digital representation M of the RF signal phasor $P_{RF}$. The relationship between $P_{RF}$ and M is given by Equation (8):

$$M = P_{RF} T_{RF}(f_{RF}) T_{IF}(f_{RF} - f_{LO}) e^{-j\phi(P_{LO})}. \tag{8}$$

Here, it is assumed that receiver 30 is linear such that superposition of multiple input tones is valid. It is also assumed that the characteristics $T_{RF}(f)$ and $T_{IF}(f)$ do not depend on $f_{LO}$. The goal is to accurately characterize the deviation from linearity of the phase characteristic (i.e., the phase dispersion) of the IF filter transfer function $T_{IF}(f)$.

Here, RF signal generator 410, LO 42, and ADC 47 synchronized to reference clock 460 such that a time invariant measurements of any signal phase can be performed. This implies that the measurement system allows measurement of the phase of any signal over and over again, independent from when exactly the phase measurement is being performed.

In one embodiment, a set of two-tone experiments may be performed to characterize the phase dispersion response of IF filter 45 as a function of frequency. Here, the test signal output by RF signal generator 419 includes at least a first RF tone $P_{RF1}$ with a frequency $f_{RF1}$ and a second RF tone $P_{RF2}$ with a frequency $f_{RF2}$, where:

$$f_{RF2} = f_{RF1} + \Delta f \tag{9}$$

It should be noted that in some embodiments, the test signal may include more than two tones, for example in an embodiment where the test signal comprises a pulsed RF signal having a plurality of tones.

In that case, time-invariant phase measurements of the filtered IF signal output by IF filter 45 are made using a set of two LO frequencies $f_{LO1}$ and $f_{LO2}$ where:

$$f_{LO1} = f_{RF1} - f_{IF}, \text{ and} \tag{10}$$

$$f_{LO2} = f_{RF2} - f_{IF} = f_{LO1} + \Delta f, \text{ with} \tag{11}$$

$f_{IF}$ equal to a particular intermediate frequency for which a phase dispersion value for the IF filter is to be measured.

Figure 6:
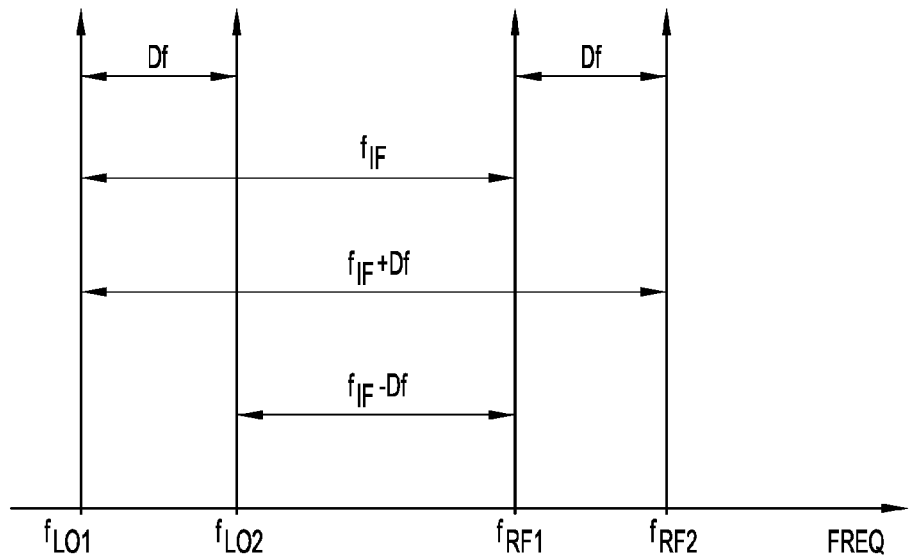
FIG. 6 shows a spectral plot illustrating relationships between RF frequencies and LO frequencies in embodiments of a method and system for characterizing the IF phase dispersion characteristics of a device such as an IF filter of a frequency translating receiver.

The phasors corresponding to the first and second local oscillator signals LO1 and LO2 are denoted by $P_{LO1}$ and $P_{LO2}$. The principles of Equations (9)-(11) are illustrated in FIG. 6, which shows a spectral plot illustrating relationships between RF frequencies and LO frequencies in embodiments of a method and system for characterizing the IF phase dispersion characteristics of a frequency translating receiver.

The RF tones $P_{RF1}$ and $P_{RF2}$ are then measured for the two local oscillator frequencies LO1 and LO2. Let $M_k[n]$ refer to the measured value of $P_{RFk}$ using a local oscillator frequency $f_k$. This measurement results in four measured quantities, given by the following equations:

$$M_1[1] = P_{RF1} T_{RF}(f_{RF1}) T_{IF}(f_{RF1} - f_{LO1}) e^{j\phi(P_{LO1})} \tag{12}$$

$$M_1[1] = P_{RF1} T_{RF}(f_{RF1}) T_{IF}(f_{RF1} - f_{LO1}) e^{-j\phi(P_{LO1})} \tag{13}$$

$$M_1[2] = P_{RF1} T_{RF}(f_{RF1}) T_{IF}(f_{RF1} - f_{LO2}) e^{-j\phi(P_{LO2})} \tag{14}$$

$$M_2[2] = P_{RF2} T_{RF}(f_{RF2}) T_{IF}(f_{RF2} - f_{LO2}) e^{-j\phi(P_{LO2})} \tag{15}$$

From the four measured quantities one may calculate a phase quantity D as follows:

$$D = \frac{1}{2}\varphi\left(\frac{M_1[1] \cdot M_2[2]}{M_2[1] \cdot M_1[1]}\right) = \frac{1}{2}\varphi\left(\frac{T_{IF}(f_{RF_1} - f_{LO_2})T_{IF}(f_{RF_2} - f_{LO_2})}{T_{IF}(f_{RF_2} - f_{LO_2})T_{IF}(f_{RF_3} - f_{LO_3})}\right) \tag{16}$$

Taking into account Equation (9) through Equation (11), as illustrated in FIG. 6, Equation (16) can be rewritten as:

$$D = \frac{1}{2}\varphi\left(\frac{T_{IF}(f_{IF})^2}{T_{IF}(f_{IF} + \Delta f)T_{IF}(f_{IF} - \Delta f)}\right) = \tag{17}$$

$$\varphi(T_{IF}(f_{IF})) - \frac{1}{2}(\varphi(T_{IF}(f_{IF} - \Delta f)) + \varphi(T_{IF}(f_{IF} + \Delta f)))$$

The quantity D is a function of $T_{IF}(.)$ only, it does not depend on $T_{RF}(.)$, $P_{RF1}$, $P_{RF2}$, $P_{LO1}$ or $P_{LO2}$. D represents the difference between the phase in the middle of the frequency range ($F_{IF} - \Delta f$, $F_{IF} + \Delta f$) and the average phase at the beginning and ending of the frequency interval. As noted earlier, this quantity D is defined as the phase dispersion of the IF channel over the frequency range ($F_{IF} - \Delta f$, $F_{IF} - \Delta f$). An interesting observation is that the quantity D is invariant towards any added constant or linear phase. As such D provides a pure measurement of the deviation from linearity of the phase characteristic, which is measurement of the value of the phase dispersion at the frequency $F_{IF}$.

Figure 7:
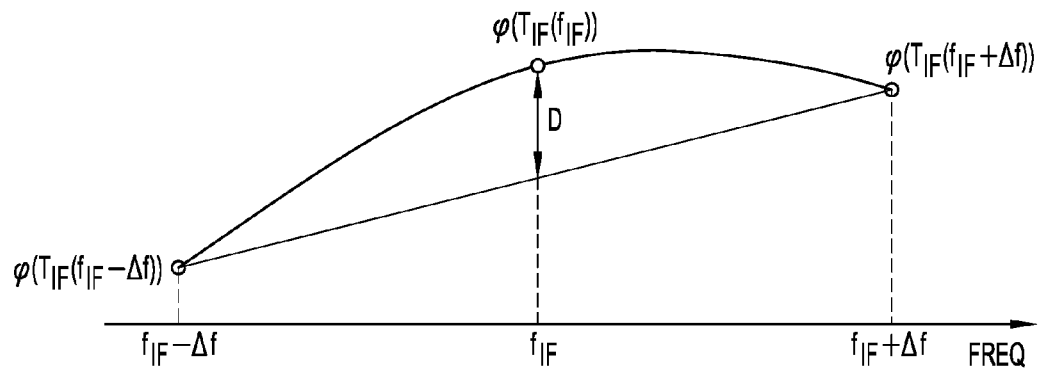
FIG. 7 shows a spectral plot illustrating an example phase dispersion characteristic of a device such as an IF filter of a frequency translating receiver.

FIG. 7 illustrates an example of the phase dispersion D of an IF channel of a frequency translating receiver across the frequency range from $f_{IF} - \Delta f$ to $f_{IF} + \Delta f$, where the phase response of the IF channel at a given frequency $f_{IF}$ is $\phi(T_{IF}(f_{IF}))$, where $T_{IF}(f_{IF})$ is the transfer function of the IF channel at the frequency $f_{IF}$.

Equation (16) allows calculation of one unknown phase as a function of two known phases. For example, if the phase at the beginning of the interval, $\phi(T_{IF}(f_{IF} - \Delta f))$, the phase at the end of the interval, $\phi(T_{IF}(f_{IF} + \Delta f))$, are known, then the value of the phase in the middle of the interval is given by:

$$\phi(T_{IF}(f_{IF})) = D + \frac{1}{2}(\phi(T_{IF}(f_{IF} - \Delta F)) + \phi(T_{IF}(f_{IF} + \Delta f))) \tag{18}$$

In another case, if the phase at the beginning of the interval, $\phi(T_{IF}(f_{IF} - \Delta f))$ if known, and the phase in the middle of the interval, $\phi(T_{IF}(f_{IF}))$ is known, then the value of the phase at the end of the interval is given by:

$$\phi(T_{IF}(f_{IF} + \Delta f)) = -2D + 2\phi(T_{IF}(f_{IF})) - \phi(T_{IF}(f_{IF} - \Delta f)) \tag{19}$$

Consider the quantity D as a function of the values $f_{IF}$ and $\Delta f$. We will call this function the phase dispersion function $D_{IF}(f_{IF}, \Delta f)$. This function can relatively easily be measured for a wide range of values $f_{IF}$ and $\Delta f$ by using a pair of two-tone measurements at two different LO frequencies, as described above. The problem of measuring the phase dispersion characteristic $\phi(T_{IF}(.))$ can then be defined as how to reconstruct $\phi(T_{IF}(.))$ from a set of sampled phase dispersion function values $D_{IF}(.,.)$. Note that $D_{IF}(.,.)$ will be unique, but the reconstructed $\phi(T_{IF}(.))$ is not as it will have twp degrees of freedom. Indeed, consider one particular reconstructed phase characteristic $\phi_1(T_{IF}(.))$, corresponding to the phase dispersion function $D_{IF}(f_{IF}, \Delta f)$. Equation (17) reveals that any phase characteristic $\phi_2(T_{IF}(.))$ defined as:

$$\phi_2(T_{IF}(f))=\phi_1(T_{IF}(f))+A+Bf \quad (20)$$

with A and B arbitrary constants, will correspond to the same $D_{IF}(f_{IF}, \Delta f)$. That implies that one is able to freely choose the values for the phase characteristic $\phi(T_{IF}(.))$ at two frequencies. The rest of the values for $\phi(T_{IF}(.))$ are uniquely determined by the measured values of the phase dispersion function $D_{IF}(f_{IF}, \Delta f)$.

There are many procedures which may be employed to reconstruct $\phi(T_{IF}(.))$ from a set of sampled phase dispersion function values $D_{IF}(.,.)$.

One procedure will be called the "interval halving procedure." Assume it is desired to reconstruct $\phi(T_{IF}(.))$ across an interval $[f_{MIN}, f_{MAX}]$. In that case, the procedure can start by measuring $$D_{IF}\left(\frac{f_{MAX}+f_{MIN}}{2}, \frac{f_{MAX}-f_{MIN}}{2}\right).$$

Using Equation (17) one can write:

$$D_{IF}\left(\frac{f_{MAX}+f_{MIN}}{2}, \frac{f_{MAX}-f_{MIN}}{2}\right)= \quad (21)$$
$$\varphi\left(T_{IF}\left(\frac{f_{MAX}+f_{MIN}}{2}\right)\right)-\frac{1}{2}\varphi(T_{IF}(f_{MAX}))-\frac{1}{2}\varphi(T_{IF}(f_{MIN}))$$

For convenience, and as we have two degrees of freedom, the values of $\phi(T_{IF}(f_{MIN}))$ and $\phi(T_{IF}(f_{MAX}))$ will be chosen to have a value of zero degrees. From Equation (18), one can then calculate $$\varphi\left(T_{IF}\left(\frac{f_{MAX}+f_{MIN}}{2}\right)\right)$$

as follows:

$$\varphi\left(T_{IF}\left(\frac{f_{MAX}+f_{MIN}}{2}\right)\right)=D_{IF}\left(\frac{f_{MAX}+f_{MIN}}{2}, \frac{f_{MAX}-f_{MIN}}{2}\right) \quad (22)$$

At that point we have values for $\phi(T_{IF}(.))$ for $f_{MIN}$, $f_{MAX}$ and for the frequency in the middle $$\frac{f_{MAX}+f_{MIN}}{2}.$$

The procedure can then be repeated on both halves of the original interval (the intervals $$\left[f_{MIN}, \frac{f_{MAX}+f_{MIN}}{2}\right]$$

and $$\left[\frac{f_{MAX}+f_{MIN}}{2}, f_{MAX}\right]$$

with a value of $\Delta f$ equal to $$\frac{f_{MAX}-f_{MIN}}{4}.$$

Using Equation (18) results in the value of $\phi(T_{IF}(.))$ at the mid points of the two smaller intervals.

The process of halving the intervals can be repeated until the desired precision for $\phi(T_{IF}(.))$ is achieved. In one variation, the halving of any particular interval can be stopped at some point while continuing the halving process on other intervals.

Figure 8:
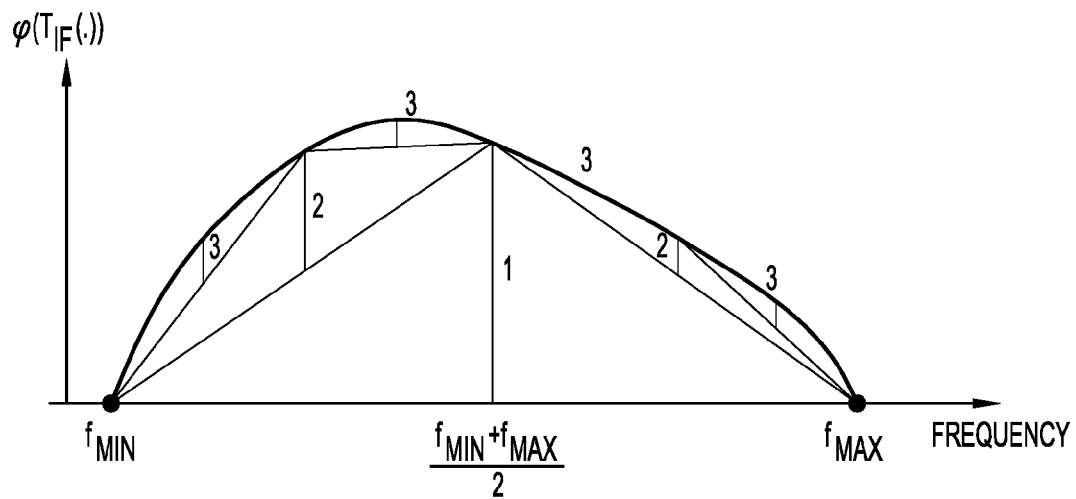
FIG. 8 shows a spectral plot illustrating an example series of phase dispersion measurements for an IF filter in a frequency translating receiver.

This interval halving procedure is illustrated in FIG. 8 which shows a spectral plot illustrating an example series of phase dispersion measurements for an IF filter in a frequency translating receiver. In FIG. 8 the measured quantities of the phase dispersion function are indicated by the vertical lines. The number next to the lines indicates the iteration number. In many cases, the measured quantities become very small after only a couple of iterations and the iteration process can stop.

An alternative to the interval halving procedure described above is a "linear continuation procedure." The function $\phi(T_{IF}(.))$ can be reconstructed across an interval $[f_{MIN}, f_{MAX}]$ by sampling the function $\phi(T_{IF}(.))$ uniformly with a resolution equal to df, where:

$$df=\frac{(f_{MAX}-f_{MIN})}{N-1}, \quad (23)$$

with N being equal to the number of sample points.

The procedure can begin by measuring $D_{IF}(f_{MIN}+df, df)$. According to Equation (17), the measured quantity is given by:

$$D_{IF}(f_{MIN}+df,df)=\phi(T_{IF}(f_{MIN}+df))-\frac{1}{2}(\phi(T_{IF}(f_{MIN}))+\phi(T_{IF}(f_{MIN}+2df))) \quad (24)$$

This results in the determination of $\phi(T_{IF}(f_{MIN}+2df))$ as:

$$\phi(T_{IF}(f_{MIN}+2df))=-2D_{IF}(f_{MIN}+df,df)+2\phi(T_{IF}(f_{MIN}+df))-\phi(T_{IF}(f_{MIN})) \quad (25)$$

As there are two degrees of freedom, arbitrary values can be chosen for $\phi(T_{IF}(f_{MIN}))$ and $\phi(T_{IF}(f_{MIN}+df))$. Next the procedure can be repeated iteratively to calculate the value of $\phi(T_{IF}(f_{MIN}+k\cdot df))$, with k any integer between 3 and N, by each time measuring the quantity $D_{IF}(f_{MIN}+(k-1)\cdot df, df)$. This is possible as Equation (25) can be generalized to:

$$\phi(T_{IF}(f_{MIN}+k\cdot df))=-2D_{IF}(f_{MIN}+(k-1)df,df)+2\phi(T_{IF}(f_{MIN}+(k-1)df))-\phi(T_{IF}(f_{MIN}+(k-2)df)) \quad (26)$$

The procedures described above perform measurements that sample the phase dispersion function and use the sampled data to reconstruct the phase dispersion function using Equation (19). Many variants of the procedures described above can be employed. For example, one could start at any frequency and move from that frequency towards both higher and lower frequencies until one reaches $f_{MIN}$ and $f_{MAX}$. In another variant, one could combine the "linear continuation" procedure and the "frequency halving" procedure. In still another variant, rather than using a two-tone procedure as described above, one could employ a test signal having three or more RF tones at three or more corresponding RF frequencies. Because of the superposition principle, if a large number of tones are employed, the measurements as described above will result in a multitude of samples for the phase dispersion function. This may shorten the measurement time as a lot of information could be gathered in one data acquisition. Another consequence of using more than two tones in the test signal is that there is redundancy in the data which may be employed to eliminate the need for ADC synchronization.

Another alternative procedure for ascertaining the phase dispersion function of an IF filter which employs a phase slope reference signal will now be described.

Consider a two-tone test signal, v(t), employed in a system (e.g., the systems of FIG. 4 or FIG. 5) and method for ascertaining the phase dispersion function of an IF filter (e.g., IF filter 45) in a frequency translating receiver, where the test signal consists of two RF tones or sinusoids at frequencies $\omega_{R1}$ and $\omega_{R2}$:

$$v(t)=A_1*\text{COS}(\omega_{R1}t+\theta_1)+A_2*\text{COS}(\omega_{R2}t+\theta_2) \quad (27)$$

In that case, from Equation (5) above, we can define the instantaneous phase at the frequency of each tone, $A_N*\text{COS}(\omega_{RN}t+\theta_N)$, as:

$$\Phi_N(t)=\omega_{RN}t+\theta_N \quad (28)$$

Now assume that the system for characterizing the phase dispersion has access to a phase slope reference signal, $v_S(t)$:

$$v_S(t)=A_S*\text{COS}(\omega_S t+\theta_S) \quad (29)$$

where $\omega_S=\omega_{R2}-\omega_{R1}$.

Figure 9:
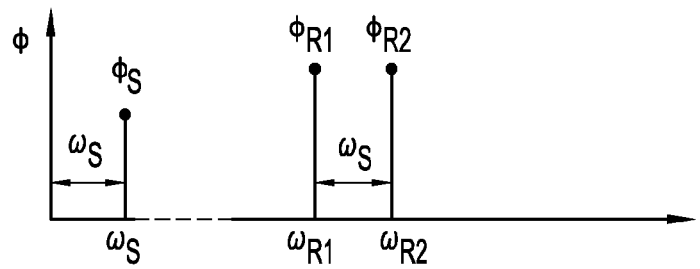
FIG. 9 shows a spectral plot illustrating relationships between the spectra of a phase slope reference signal and a test signal for determining the phase dispersion response of a device such as an IF filter of a frequency translating receiver.

FIG. 9 shows a spectral plot illustrating relationships between the spectra of the phase slope reference signal $v_S(t)$ and the frequencies $\omega_1 t$ and $\omega_2 t$ of two RF tones included in the test signal for ascertaining the phase dispersion function of an IF filter in a frequency translating receiver.

Figure 10:
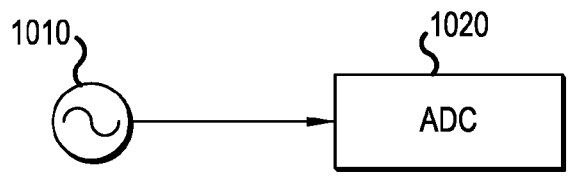
FIG. 10 shows a block diagram illustrating an embodiment of a phase slope reference generator which may be employed in an embodiment of a system for characterizing the IF phase dispersion response of a device such as an IF filter of a frequency translating receiver.

FIG. 10 shows a block diagram illustrating an embodiment of a phase slope reference generator 1010 which may be employed in an embodiment of a system for characterizing the IF phase dispersion response of a frequency translating receiver, such as the systems shown in FIGS. 4 and 5 above. Here the system also includes a second analog-to-digital converter (ADC) 1020 for sampling a phase slope reference signal produced by phase slope reference generator 1010. In an alternative embodiment, the phase slope reference signal may be produced by a numerically-controlled oscillator (NCO) whose phase may then be obtained directly without any need for a separate ADC.

Figure 11:
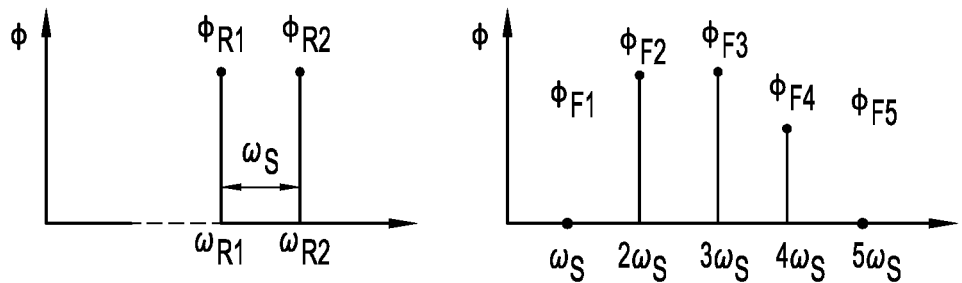
FIG. 11 shows spectral plots illustrating example RF tones included in a test signal and an example normalized phase response of a device such as an IF filter of a frequency translating receiver as a function of IF frequency.

FIG. 11 shows spectral plots illustrating example RF tones included in a test signal v(t), and an example normalized IF phase response of a receiver (e.g., receiver 50) as a function of IF frequency. Here, the IF phase response as a function of frequency over the IF bandwidth is described by $\Phi_{F1}, \Phi_{F2} \ldots \Phi_{F5}$ at frequencies $\omega_S, 2\omega_S \ldots 5\omega_S$.

To characterize the IF phase dispersion response, the test signal v(t) is applied to the input of the receiver. The LO (e.g., LO 42) causes the receiver to mix the frequencies $\omega_{R1}$ and $\omega_{R2}$ down to the IF where the converted frequencies are measured by an ADC (e.g., ADC 47). By making repeated measurements of the IF signal with appropriate LO frequencies, the IF phase response may be ascertained at frequencies $\omega_S, 2\omega_S \ldots 5\omega_S$. Since we are only concerned with the phase dispersion response, and not the absolute phase response itself, the offset and slope of the phase response can be normalized by setting $\Phi_{F1}$ and $\Phi_{F5}$ to zero. Meanwhile, the phase slope reference signal is tuned to $\omega_S$ and the phase of the phase slope reference signal is measured at the same times as the phase measurements of the IF spectrum.

Figure 12A:
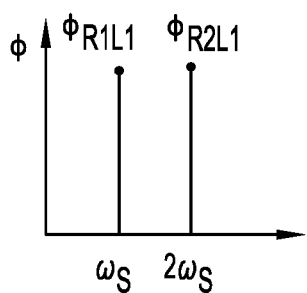
FIGS. 12A, 12B, 12C and 12D show spectral plots illustrating a series of measurements of an IF spectrum which may be used to stitch together the IF phase dispersion characteristic of a device such as an IF filter of a frequency translating receiver.
Figure 12B:
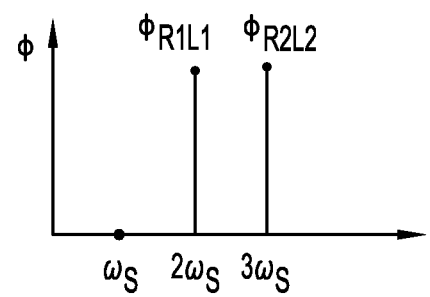
Figure 12C:
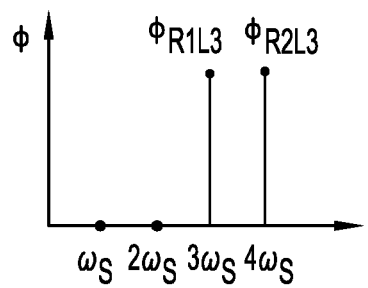
Figure 12D:
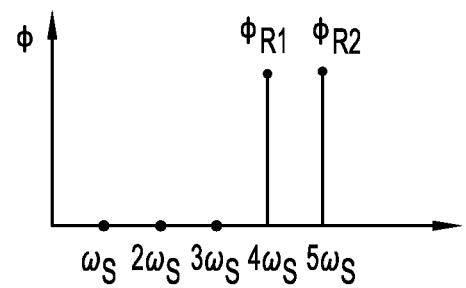

FIGS. 12A, 12B, 12C and 12D show spectral plots illustrating a series of measurements of an IF spectrum which may be used to stitch together the IF phase dispersion characteristic of a frequency translating receiver. In particular, FIG. 12A illustrates the IF spectrum when the LO signal has a first LO frequency L1, FIG. 12B illustrates the IF spectrum when the LO signal has a first LO frequency L2, FIG. 12C illustrates the IF spectrum when the LO signal has a first LO frequency L3, and FIG. 12D illustrates the IF spectrum when the LO signal has a first LO frequency L4.

As shown in FIGS. 12A-12D, eight measurements, M1 through M8, are made as follows:

$$@L1:M1=\Phi_{R1}-\Phi_{L1}-\Phi_{F1}-\Phi_S$$

$$@L1:M2=\Phi_{R2}-\Phi_{L1}-\Phi_{F2}-2\Phi_S$$

$$@L2:M3=\Phi_{R1}-\Phi_{L2}-\Phi_{F2}-2\Phi_S$$

$$@L2:M4=\Phi_{R2}-\Phi_{L2}-\Phi_{F3}-3\Phi_S$$

$$@L3:M5=\Phi_{R1}-\Phi_{L3}-\Phi_{F3}-3\Phi_S$$

$$@L3:M6=\Phi_{R2}-\Phi_{L3}-\Phi_{F4}-4\Phi_S$$

$$@L4:M7=\Phi_{R1}-\Phi_{L4}-\Phi_{F4}-4\Phi_S$$

$$@L4:M8=\Phi_{R2}-\Phi_{L4}-\Phi_{F5}-5\Phi_S$$

The measurements M1 through M8 may be combined as:

$$M2-M1=\Phi_{R2}-\Phi_{R1}-\Phi_{F2}+\Phi_{F1}-\Phi_S$$

$$M4-M3=\Phi_{R2}-\Phi_{R1}-\Phi_{F3}+\Phi_{F2}-\Phi_S$$

$$M6-M5=\Phi_{R2}-\Phi_{R1}-\Phi_{F4}+\Phi_{F3}-\Phi_S$$

$$M8-M7=\Phi_{R2}-\Phi_{R1}-\Phi_{F5}+\Phi_{F4}-\Phi_S$$

$$(M4-M3)-(M2-M1)=\Phi_{F3}+2\Phi_{F2}-\Phi_{F1}$$

$$(M6-M5)-(M4-M3)=\Phi_{F4}+2\Phi_{F3}-\Phi_{F2}$$

$$(M8-M7)-(M6-M5)=\Phi_{F5}+2\Phi_{F4}-\Phi_{F3}$$

Since, as discussed above, we can set $\Phi_{F1}$ and $\Phi_{F5}$ to zero, then these three equations can be solved for the three unknowns $\Phi_{F2}$, $\Phi_{F3}$ and $\Phi_{F4}$.

Many variations are possible. For example, the test signal need not consist of only two pure RF tones or sinusoids. In some embodiments, as mentioned above, the test signal may be a pulse-modulated RF waveform with prominent sidetones, or some other modulated signal. In another variation, the test signal may include more than two RF tones, and the phase dispersion response may be characterized using only two LO frequencies while measuring all of the RF tones in the test signal. In another variation, the test signal may have three (or more) RF tones, and the phase dispersion response may be characterized by using the measured phases at the two outer tones or frequencies as a phase slope reference, and measuring the deviation of the phase at the center tone from a slope passing through the phases of the two outer tones.

Figure 13:
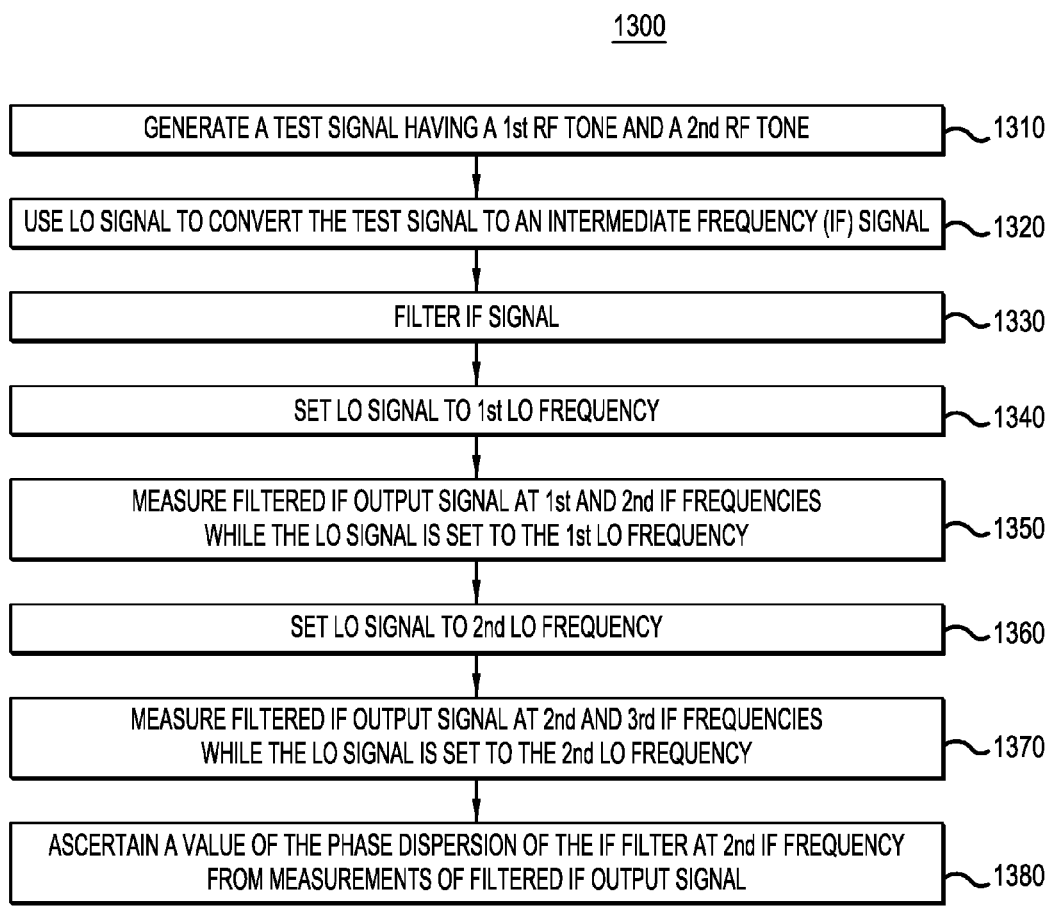
FIG. 13 shows a flowchart of an example embodiment of a method of ascertaining a phase dispersion D of a device, such as an IF filter of a frequency translating receiver, at a particular IF frequency.

Based on the preceding discussion, FIG. 13 shows a flowchart of an example embodiment of a method 1300 of ascertaining a phase dispersion D of an IF filter, such as IF filter 45 of receiver 50, at a particular IF frequency.

An operation 1310 includes generating a test signal having a first RF tone at a first frequency and a second RF tone at a second frequency.

An operation 1320 includes using an LO signal to convert the test signal to an intermediate frequency (IF) signal.

An operation 1330 includes filtering the IF signal to produce a filtered IF output signal.

In an operation 1340 includes setting the LO signal to a first LO frequency.

In an operation 1350 includes measuring the filtered IF output signal at first and second IF frequencies while the LO signal is set to the first LO frequency. Here, the first IF frequency is a difference between the second RF frequency and the first LO frequency, and the second IF frequency is a difference between the first RF frequency and the first LO frequency.

In an operation 1360 includes setting the LO signal to a second LO frequency.

In an operation 1370 includes measuring the filtered IF output signal at second and third IF frequencies while the LO signal is set to the second LO frequency. Here, the third IF frequency is a difference between the first RF frequency and the second LO frequency In an operation 1380 includes ascertaining a value D of the phase dispersion of the IF filter at the second IF frequency from measurements of the filtered IF output signal.

Beneficially, in method 1300 the measurements of the filtered IF output signal in operations 1350 and 1370 measure time-invariant phase.

Figure 14:
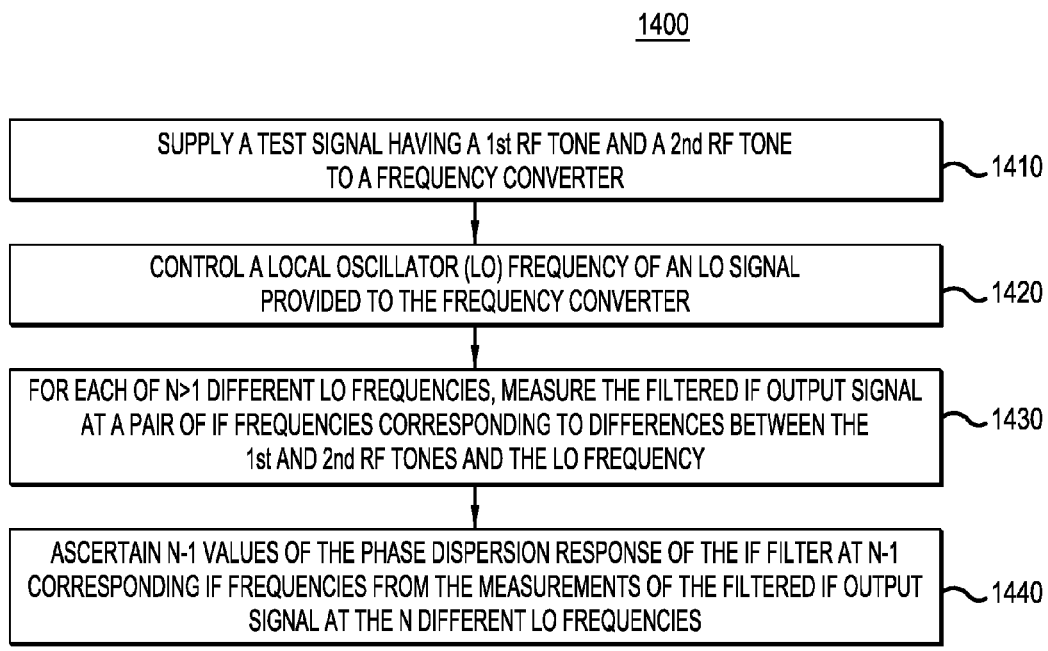
FIG. 14 shows a flowchart of an example method of ascertaining a phase dispersion characteristic of a device such as an IF filter of a frequency translating receiver.

FIG. 14 shows a flowchart of an example method 1400 of ascertaining a phase dispersion characteristic of an IF filter such as IF filter 45 in receiver 50.

An operation 1410 includes supplying a test signal having a first RF tone at a first frequency and a second RF tone at a second frequency to a frequency converter (e.g., mixer 43 of receiver 50). Here, the IF output signal of the frequency converter is supplied to an input of IF filter (IF filter 45), in response to which the IF filter provides a filtered IF output signal.

An operation 1420 includes controlling a local oscillator (LO) frequency of an LO signal provided to the frequency converter.

An operation 1430 includes, for each of N>1 different LO frequencies, measuring the filtered IF output signal at a pair of IF frequencies corresponding to differences between the frequencies of the $1^{st}$ and $2^{nd}$ RF tones and the LO frequency. Here, an IF output signal of the frequency converter is supplied to an input of an IF filter (e.g., IF filter 45), in response to which the IF filter provides a filtered IF output signal. Beneficially, the measurements of the filtered IF output signal measure time-invariant phase.

An operation 1440 includes ascertaining N−1 values of the phase dispersion response of the IF filter at N−1 corresponding IF frequencies from the measurements of the filtered IF output signal at the N different LO frequencies.

In some other embodiments, a measurement system includes a phase clock which can keep track of system time, for example by providing a time-stamp for aligning phase measurements. In that case, it is possible to characterize the phase dispersion of the IF filter of a frequency translating receiver using an RF source with a single tone, as will be described below.

In particular, in some embodiments data samples output by the ADC (e.g., ADC 47 or ADC 447 in FIG. 4 or 5) may be time-stamped by the ADC (or by a subsequent DSP), and a time-stamped frequency source may be employed either as the LO (e.g., LO 42 or LO 420 in FIG. 4 or 5) or the test or RF signal generator (e.g., RF signal generator 410 in FIGS. 4 and 5). Beneficially, the time-stamped frequency source and the time-stamped ADC may use a common phase clock, or each may use a separate phase clock where the separate phase clocks are synchronized to each other. Furthermore, the time-stamped frequency source may be controlled to output a signal whose phase has a known value at the system clock's time zero.

In a first example, a process for characterizing three frequencies ($\omega_{f1}$, $\omega_{f2}$, and $\omega_{f3}$) of the IF filter response is described in a case where it is assumed that the test or RF signal generator (e.g., RF signal generator 410 in FIGS. 4 and 5) has a phase clock and the time-stamping capability, and the ADC also has a phase clock and the time-stamping capability, as described above. The first example describes a case where the mixer employs low-side LO mixing, but it is a trivial modification to describe the case where the mixer employs high-side mixing.

Here, the IF filter response is normalized so that the normalized instantaneous phases $\theta_{F1}$ and $\theta_{F3}$ of the first and third frequencies $\omega_{f1}$ and $\omega_{f3}$ are set to zero, and the normalized instantaneous phase $\theta_{F3}$ of the second frequency $\omega_{f2}$ is characterized.

For a low-side LO mixer: $\Phi_I = \Phi_R - \Phi_L - \theta_F$.

In a first measurement, the RF tone is set to $\omega_{R1}$, the LO frequency is set to $\omega_{L1}$ and the instantaneous phase $\Phi_I$ of the IF signal is measured at $\omega_{f1}$:

$$M1(\omega_{f1}) = \Phi_{R1} - \Phi_{L1} - \theta_{F1} \quad (30)$$

Next, while the LO is left at the frequency $\omega_{L1}$, the RF frequency is changed from $\omega_{R1}$ to $\omega_{R2}$, and the instantaneous phase $\Phi_I$ of the IF signal is measured at $\omega_{f2}$:

$$M2(\omega_{f2}) = \Phi_{R2} - \Phi_{L1} - \theta_{F2} \quad (31)$$

Here, because, as noted above, the test or RF signal generator (e.g., RF signal generator 410 in FIGS. 4 and 5) has a phase clock and time-stamping capability, any phase shift which would otherwise occur in the RF signal when the RF frequency is changed from $\omega_{R1}$ to $\omega_{R2}$ can be eliminated.

Then, while the RF frequency is left at $\omega_{R2}$, the LO frequency is changed from $\omega_{L1}$ to $\omega_{L2}$, and the instantaneous phase $\Phi_I$ of the IF signal is measured at $\theta_{f3}$:

$$M3(\omega_{f3}) = \Phi_{R2} - \Phi_{L2} - \theta_{F3} \quad (32)$$

Here, because in general the LO (e.g., LO 420 in FIG. 4 or LO 42 in FIG. 5) does not have the phase clock and time-stamping capability, an unknown phase shift occurs in the LO signal when the LO frequency is changed from $\omega_{L1}$ to $\omega_{L2}$. This phase shift must be compensated for or eliminated in order to get correct measurements of the phase dispersion response of the IF filter.

Accordingly, while the LO is left at the frequency $\omega_{L2}$, the RF frequency is changed back to $\omega_{R1}$ with the same phase it had for the first measurement $M1(\omega_{f1})$, and the instantaneous phase $\Phi_I$ of the IF signal is measured at $\theta_{f2}$:

$$M4(\omega_{f2}) = \Phi_{R1} - \Phi_{L2} - \theta_{F2} \quad (33)$$

Here, it is noted that the RF signal can be set to the same phase in the first measurement $M1(\omega_{f1})$ and the fourth measurement $M4(\omega_{f2})$ because, as noted above, the test or RF signal generator (e.g., RF signal generator 410 in FIGS. 4 and 5) has a phase clock and time-stamping capability. Because measurements $M2(\omega_{f2})$ and $M4(\omega_{f2})$ measure the phase of the same IF frequency ($\omega_{f2}$) with the RF signal having the same phase, then any difference in the phase of the IF signal between the two measurements due to the unknown phase shift in the LO signal between the second and third measurements can be determined, and this unknown phase shift can be canceled out or eliminated through a proper mathematical combination of the four measurements.

Accordingly, the four measurements may be combined as:

$$M4-M3+M2-M1=\theta_{F3}-2*\theta_{F2}+\theta_{F1} \quad (34)$$

As noted above, for a normalized filter, $\theta F3=\theta F1=0$, so one can find:

$$\theta_{F2}=(-M4+M3-M2+M1)/2, \quad (35)$$

which is the phase dispersion of the IF filter at IF frequency $\omega_{I2}$ which it was desired to obtain. Additional measurements of the phase dispersion of the IF filter at additional IF frequencies can be made by applying the frequency halving technique or linear continuation procedure described above.

In a second example, a process for characterizing three frequencies ($\omega_{I1}$, $\omega_{I2}$, and $\omega_{I3}$) of the IF filter response is described in a case where it is assumed that the LO (e.g., LO 420 in FIG. 4 or LO 42 in FIG. 5) has a phase clock and the time-stamping capability, and the ADC also has a phase clock and the time-stamping capability, as described above. The second example again describes a case where the mixer employs low-side LO mixing, but it is a trivial modification to describe the case where the mixer employs high-side mixing.

Again, the IF filter response is normalized so that the normalized instantaneous phases $\theta_{F1}$ and $\theta_{F3}$ of the first and third frequencies $\omega_{I1}$ and $\omega_{I3}$ are set to zero, and the normalized instantaneous phase $\theta_{F3}$ of the second frequency $\omega_{I2}$ is characterized.

In a first measurement, the RF tone is set to $\omega_{R1}$, the LO frequency is set to $\omega_{L1}$ and the instantaneous phase $\Phi_I$ of the IF signal is measured at $\omega_{I1}$:

$$M1(\omega_{I1})=\Phi_{R1}-\Phi_{L1}-\theta_{F1} \quad (36)$$

Next, while the RF frequency is left at $\omega_{R1}$, the LO is tuned to $\omega_{L2}$, and the instantaneous phase $\Phi_I$ of the IF signal is measured at $\omega_{I2}$:

$$M2(\omega_{I2})=\Phi_{R1}-\Phi_{L2}-\theta_{F2} \quad (37)$$

Here, because, as noted above, the LO (e.g., LO 420 in FIG. 4 or LO 42 in FIG. 5) has a phase clock and time-stamping capability, any phase shift which otherwise would occur in the LO signal when the LO frequency is changed from $\omega_{L1}$ to $\omega_{L2}$ can be eliminated.

Then, while the LO is left at $\omega_{L2}$, the RF frequency is changed to $\omega_{R2}$, and the instantaneous phase $\Phi_1$ of the IF signal is measured at $\omega_{I3}$:

$$M3(\omega_{I3})=\Phi_{R2}-\Phi_{L2}-\theta_{F3} \quad (38)$$

Here, because in general the RF signal generator (e.g., RF signal generator 410 in FIGS. 4 and 5) does not have the phase clock and time-stamping capability, an unknown phase shift occurs in the RF signal when the RF frequency is changed from $\omega_{R1}$ to $\omega_{R2}$. This phase shift must be compensated for or eliminated in order to get correct measurements of the phase dispersion response of the IF filter.

Finally, while the RF frequency is left at $\omega_{R2}$, the LO is tuned back to $\omega_{L1}$ with the same phase it had for the first measurement $M1(\omega_{I1})$, and the instantaneous phase $\Phi_I$ of the IF signal is measured at $\omega_{I2}$:

$$M4(\omega_{I2})=\Phi_{R2}-\Phi_{L1}-\theta_{F2} \quad (39)$$

Here, it is noted that the LO signal can be set to the same phase in the first measurement $M1(\omega_{I1})$ and the fourth measurement $M4(\omega_{I2})$ because, as noted above, the LO has a phase clock and time-stamping capability. Because measurements $M2(\omega_{I2})$ and $M4(\omega_{I2})$ measure the phase of the same IF frequency ($\omega_{I2}$) with the LO signal having the same phase, then any difference in the phase of the IF signal between the two measurements due to the unknown phase shift in the RF signal between the second and third measurements can be determined, and this unknown phase shift can be canceled out or eliminated through a proper mathematical combination of the four measurements.

Accordingly, the four measurements may be combined using Equation (34) above, as:

$$M4-M3+M2-M1=\theta_{F3}-2*\theta_{F2}+\theta_{F1} \quad (34)$$

As noted above, for a normalized filter, $\theta F3=\theta F1=0$, so one can find using Equation (35) above:

$$\theta_{F2}=(-M4+M3-M2+M1)/2, \quad (35)$$

which is the phase dispersion of the IF filter at IF frequency $\omega_{I2}$ which it was desired to obtain. Additional measurements of the phase dispersion of the IF filter at additional IF frequencies can be made by applying the frequency halving technique or linear continuation procedure described above.

Figure 15:
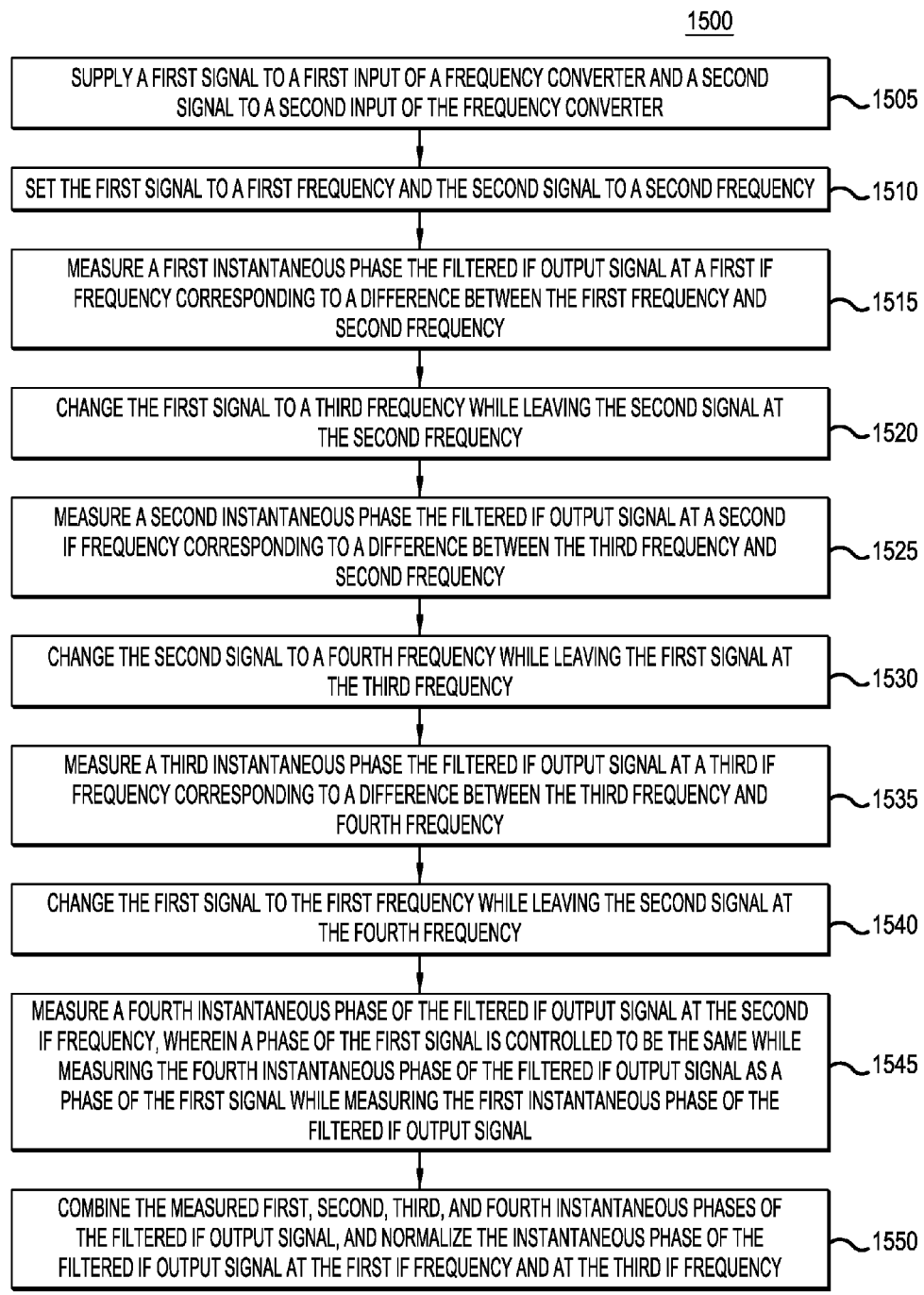
FIG. 15 shows a flowchart of another example method of ascertaining a phase dispersion characteristic of a device such as an IF filter of a frequency translating receiver.

With above examples in mind, FIG. 15 is a flowchart of a more generalized method or process 1500 of characterizing a phase dispersion response of an IF filter with an RF signal generator which produces a single frequency tone.

In an operation 1505, a first signal is supplied to a first input of a frequency converter and a second signal is supplied to a second input of the frequency converter, and an intermediate frequency (IF) output signal of the frequency converter is supplied to an input of an IF filter, in response to which the IF filter provides a filtered IF output signal.

In an operation 1510, the first signal is set to a first frequency and the second signal is set to a second frequency. Here it is understood that the first signal may be set to the first frequency and the second signal may be set to the second frequency prior to supplying the first signal to the first input of the frequency converter and/or prior to supplying the second signal to the second input of the frequency converter. So the order of these particular operations 1510 and 1520 may be reversed.

In an operation 1515, a first instantaneous phase the filtered IF output signal is measured at a first IF frequency corresponding to a difference between the first frequency and second frequency.

In an operation 1520, the first signal is changed to a third frequency while leaving the second signal at the second frequency.

In an operation 1525, a second instantaneous phase of the filtered IF output signal is measured at a second IF frequency corresponding to a difference between the third frequency and the second frequency.

In an operation 1530, the second signal is changed to a fourth frequency while leaving the first signal at the third frequency.

In an operation 1535, a third instantaneous phase of the filtered IF output signal is measured at a third IF frequency corresponding to a difference between the third frequency and the fourth frequency;

In an operation 1540, the first signal is changed to the first frequency while leaving the second signal at the fourth frequency In an operation 1545, a fourth instantaneous phase of the filtered IF output signal is measured at the second IF frequency corresponding to the difference between the third frequency and the second frequency, wherein a phase of the first signal is controlled to be the same while measuring the fourth instantaneous phase of the filtered IF output signal as a phase of the first signal while measuring the first instantaneous phase of the filtered IF output signal.

In an operation 1550, the measured first instantaneous phase of the filtered IF output signal, the measured second instantaneous phase of the filtered IF output signal, the measured third instantaneous phase of the filtered IF output signal, and the measured fourth instantaneous phase of the filtered IF output signal and combined, and the instantaneous phase of the filtered IF output signal at the first IF frequency and at the third IF frequency are normalized, to obtain a phase dispersion of the IF filter at the second IF frequency.

As mentioned above, in some embodiments the first signal may be the RF signal and the second signal is the LO signal, while in other embodiments the first signal may be the LO signal while the second signal is the RF signal. Also as mentioned above, the operations of process or method 1500 may be repeated by applying the frequency halving technique or linear continuation procedure described above, for example, to obtain the phase dispersion of the IF filter at a plurality of different IF frequencies.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A method, comprising:
generating a test signal having a first tone at a first radio frequency (RF) frequency and a second tone at a second RF frequency;
using a local oscillator (LO) signal to convert the test signal to an intermediate frequency (IF) signal;
filtering the IF signal with an IF filter to produce a filtered IF output signal;
setting the LO signal to a first LO frequency;
measuring the filtered IF output signal at first and second IF frequencies while the LO signal is set to the first LO frequency, wherein the first IF frequency is a difference between the second RF frequency and the first LO frequency, and the second IF frequency is a difference between the first RF frequency and the first LO frequency;
setting the LO signal to a second LO frequency, wherein a frequency difference between the second LO frequency and the first LO frequency is equal to a frequency difference $\Delta f$ between the second RF frequency and the first RF frequency of the test signal;
measuring the filtered IF output signal at the second IF frequency and at a third IF frequency while the LO signal is set to the second LO frequency, wherein the third IF frequency is a difference between the first RF frequency and the second LO frequency; and
ascertaining a value D of a phase dispersion of the IF filter at the second IF frequency from the measurements of the filtered IF output signal,
where the measurements of the filtered IF output signal measure time-invariant phase.

2. The method of claim 1, wherein measuring the filtered IF output signal includes:
measuring a phasor M1[1] of the filtered IF output signal at the second IF frequency while the LO signal is set to the first LO frequency,
measuring a phasor M2[1] of the filtered IF output signal at the first IF frequency while the LO signal is set to the first LO frequency,
measuring a phasor M1[2] of the filtered IF output signal at the third IF frequency while the LO signal is set to the second LO frequency, and
measuring a phasor M2[2] of the filtered IF output signal at the second IF frequency while the LO signal is set to the second LO frequency; and
wherein ascertaining the value D of the phase dispersion of the IF filter at the second IF frequency comprises ascertaining $$D = \frac{1}{2}\varphi\left(\frac{M1[1]\cdot M2[2]}{M2[1]\cdot M1[1]}\right),$$

where $\varphi(x)$ is a phase of x.

3. The method of claim 1, further comprising measuring the filtered IF output signal at a plurality of additional IF frequencies for a plurality of first RF frequencies, second RF frequencies, LO frequencies, and frequency differences $\Delta f$, and ascertaining a phase dispersion characteristic of the IF filter as a function of IF frequency from the measurements of the filtered IF output signal.

4. The method of claim 1, wherein measuring the filtered IF output signal includes:
digitizing the filtered IF output with an analog-to-digital converter (ADC) to produce digital data; and
applying a discrete Fourier transform to the digital data to obtain a digital representation of the filtered IF output signal as a function of frequency.

5. The method of claim 4, wherein the first RF frequency, second RF frequency, first LO frequency, second LO frequency, and the ADC are all synchronized to a common reference clock.

6. The method of claim 4, further comprising:
providing a phase slope reference signal, the phase slope reference signal synchronized to the first and second RF frequencies and having a frequency equal to a difference between the first and second RF frequencies;
ascertaining phases of the phase slope reference signal corresponding to the times when measuring the filtered IF output signal at the first and second IF frequencies while the LO signal is set to the first LO frequency and corresponding to the times when measuring the filtered IF output at the second IF frequency and at a third IF frequency while the LO signal is set to the second LO frequency; and
adjusting the measurements of the filtered IF output signal by the ascertained phases of the phase slope reference signal.

7. The method of claim 1, wherein using the local oscillator (LO) signal to convert the test signal to an intermediate frequency (IF) signal comprises:
supplying the test signal to an RF filter; and
supplying the LO signal and an output of the RF filter and to a mixer.

8. The method of claim 1, wherein the test signal further has a third RF frequency, the method further comprising:
measuring the filtered IF output signal at the third IF frequency while the LO signal is set to the first LO frequency;
measuring the filtered IF output at the a fourth IF frequency while the LO signal is set to the second LO frequency; and ascertaining a phase dispersion of the IF filter at the third IF frequency from the measurements of the filtered IF output signal.

9. The method of claim 1, wherein generating the test signal having the first tone at the first RF frequency and the second tone at the second RF frequency comprises generating a pulsed RF signal having at least the first tone and the second tone.

10. A system, comprising:
a radio frequency (RF) signal generator configured to produce a test signal having a first tone at a first RF frequency and a second tone at a second RF frequency and further configured to supply the test signal to a superheterodyne receiver, the superheterodyne receiver also receiving a local oscillator (LO) signal and in response to the test signal and the LO signal supplying an intermediate signal (IF) output signal to an input of an IF filter, in response to which the IF filter outputs a filtered IF output signal;
an IF signal processor configured to process the filtered IF signal; and
a controller configured to control the system to:
set the LO signal to a first LO frequency;
measure the filtered IF output signal at first and second IF frequencies while the LO signal is set to the first LO frequency;
set the LO signal to a second LO frequency, wherein a frequency difference between the second LO frequency and the first LO frequency is equal to a frequency difference $\Delta f$ between the second RF frequency and the first RF frequency of the test signal;
measure the filtered IF output at the second IF frequency and at a third IF frequency while the LO signal is set to the second LO frequency, where the third IF frequency is a difference between the first RF frequency and the second LO frequency; and
ascertain a value D of a phase dispersion of the IF filter at the second IF frequency from the measurements of the filtered IF output signal,
where the measurements of the filtered IF output signal measure time-invariant phase.

11. The system of claim 10, wherein measuring the filtered IF output signal includes:
measuring a phasor M1[1] of the filtered IF output signal at the second IF frequency while the LO signal is set to the first LO frequency,
measuring a phasor M2[1] of the filtered IF output signal at the first IF frequency while the LO signal is set to the first LO frequency,
measuring a phasor M1[2] of the filtered IF output signal at the third IF frequency while the LO signal is set to the second LO frequency, and
measuring a phasor M2[2] of the filtered IF output signal at the second IF frequency while the LO signal is set to the second LO frequency; and
wherein ascertaining the phase dispersion D of the IF filter at the second IF frequency comprises ascertaining $$D = \frac{1}{2}\varphi\left(\frac{M1[1]\cdot M2[2]}{M2[1]\cdot M1[1]}\right),$$

where $\varphi(x)$ is a phase of x.

12. The system of claim 10, wherein the controller is further configured to control the RF generator to adjust the first and second RF frequencies and to control the LO to adjust the LO frequencies, and to measure the filtered IF output signal at a plurality of additional IF frequencies for a corresponding plurality of first RF frequencies, second RF frequencies, LO frequencies, and frequency differences $\Delta f$, and to ascertain a phase dispersion characteristic of the IF filter as a function of IF frequency from the measurements of the filtered IF output signal.

13. The system of claim 10, wherein the IF signal processor includes:
an analog-to-digital-converter (ADC) configured to digitize the filtered IF signal to produce digital data; and
a digital-signal-processor configured to apply a discrete Fourier transform to the digital data to obtain a digital representation of the filtered IF output signal as a function of frequency, and to process the digital representation of the filtered IF output signal as a function of frequency to measure the filtered IF output signal.

14. The system of claim 13, wherein the first RF frequency, second RF frequency, first LO frequency, second LO frequency, and the ADC are all synchronized to a common reference clock.

15. The system of claim 10, further comprising a phase slope reference signal generator configured to generate a phase slope reference signal synchronized to the first and second RF frequencies and having a frequency equal to a difference between the first and second RF frequencies,
wherein the controller is configured to control the system to ascertain phases of the phase slope reference signal corresponding to the times when measuring the filtered IF output signal at the first and second IF frequencies while the LO signal is set to the first LO frequency and corresponding to the times when measuring the filtered IF output at the second IF frequency and at a third IF frequency while the LO signal is set to the second LO frequency, and to adjust the measurements of the filtered IF output signal by the ascertained phases of the phase slope reference signal.

16. The system of claim 15, wherein the phase slope reference signal generator comprises a numerically controlled oscillator (NCO).

17. The system of claim 10, wherein the test signal further has a third tone at a third RF frequency, wherein the controller is further configured to control the system to:
measure the filtered IF output signal at the third IF frequency while the LO signal is set to the first LO frequency;
measure the filtered IF output at a fourth IF frequency while the LO signal is set to the second LO frequency; and
ascertain a phase dispersion of the IF filter at the third IF frequency from the measurements of the filtered IF output signal.

18. The system of claim 10, wherein the RF signal generator comprises a pulse modulated signal generator generating a pulsed RF signal having at least the first tone and the second tone.

19. A method, comprising:
supplying a test signal having a first tone at a first radio frequency (RF) frequency and a second tone at a second RF frequency to a frequency converter;
controlling a local oscillator (LO) frequency of an LO signal provided to the frequency converter, wherein an IF output signal of the frequency converter is supplied to an input of an intermediate frequency (IF) filter, in response to which the IF filter provides a filtered IF output signal;

for each of N>1 different LO frequencies, measuring the filtered IF output signal at a pair of IF frequencies corresponding to differences between the first and second RF frequencies and the LO frequency, where the measurements of the filtered IF output signal measure time-invariant phase; and ascertaining N−1 values of a phase dispersion response of the IF filter at N−1 corresponding IF frequencies from the N measurements of the filtered IF output signal at the N different LO frequencies.

20. The method of claim 19, wherein measuring the filtered IF output signal includes:

measuring a phasor M1[1] of the filtered IF output signal at the second IF frequency while the LO signal is set to a first LO frequency, measuring a phasor M2[1] of the filtered IF output signal at the first IF frequency while the LO signal is set to the first LO frequency, measuring a phasor M1[2] of the filtered IF output signal at the third IF frequency while the LO signal is set to a second LO frequency, and measuring a phasor M2[2] of the filtered IF output signal at the second IF frequency while the LO signal is set to the second LO frequency; and wherein ascertaining the phase dispersion D of the IF filter at the second IF frequency comprises ascertaining $$D = \frac{1}{2}\varphi\left(\frac{M1[1] \cdot M2[2]}{M2[1] \cdot M1[1]}\right),$$

where φ(x) is a phase of x.

21. The method of claim 19, wherein measuring the filtered IF output signal includes:

digitizing the filtered IF output with an analog-to-digital converter (ADC) to produce digital data; and applying a discrete Fourier transform to the digital data to obtain a digital representation of the filtered IF output signal as a function of frequency, wherein the first RF frequency, second RF frequency, first LO frequency, second LO frequency, and the ADC are all synchronized to a common reference clock.

22. The method of claim 19, wherein the test signal further has a third RF frequency, the method further comprising:

for each of N>1 different LO frequencies, measuring the filtered IF output signal at a third IF frequency corresponding to a difference between the third RF frequency and the LO frequency; and ascertaining an Nth value of phase dispersion D of the IF filter an Nth IF frequency from the N measurements of the filtered IF output signal at the N different LO frequencies.

23. The method of claim 19, wherein supplying to the frequency converter the test signal having the first tone at the first RF frequency and the second tone at the second RF frequency comprises generating a pulsed RF signal having at least the first tone and the second tone.

24. A method, comprising:

supplying a first signal to a first input of a frequency converter and supplying a second signal to a second input of the frequency converter, wherein an intermediate frequency (IF) output signal of the frequency converter is supplied to an input of an IF filter, in response to which the IF filter provides a filtered IF output signal;

setting the first signal to a first frequency and the second signal to a second frequency, and measuring a first instantaneous phase the filtered IF output signal at a first IF frequency corresponding to a difference between the first frequency and second frequency;

changing the first signal to a third frequency while leaving the second signal at the second frequency, and measuring a second instantaneous phase of the filtered IF output signal at a second IF frequency corresponding to a difference between the third frequency and the second frequency;

changing the second signal to a fourth frequency while leaving the first signal at the third frequency, and measuring a third instantaneous phase of the filtered IF output signal at a third IF frequency corresponding to a difference between the third frequency and the fourth frequency;

changing the first signal to the first frequency while leaving the second signal at the fourth frequency, and measuring a fourth instantaneous phase of the filtered IF output signal at the second IF frequency corresponding to the difference between the third frequency and the second frequency, wherein a phase of the first signal is controlled to be the same while measuring the fourth instantaneous phase of the filtered IF output signal as a phase of the first signal while measuring the first instantaneous phase of the filtered IF output signal; and combining the measured first instantaneous phase of the filtered IF output signal, the measured second instantaneous phase of the filtered IF output signal, the measured third instantaneous phase of the filtered IF output signal, and the measured fourth instantaneous phase of the filtered IF output signal, and normalizing the instantaneous phase of the filtered IF output signal at the first IF frequency and at the third IF frequency, to obtain a phase dispersion of the IF filter at the second IF frequency.

25. The method of claim 24, wherein the frequency converter comprises a mixer having a radio frequency (RF) input port and a local oscillator (LO) input port, and wherein the first signal is applied to the RF input port, and the second signal is applied to the LO input port.

26. The method of claim 24, wherein the frequency converter comprises a mixer having a radio frequency (RF) input port and a local oscillator (LO) input port, and wherein the first signal is applied to the LO input port, and the second signal is applied to the RF input port.

* * * * *

UNITED STATES PATENT AND TRADEMARK OFFICE
CERTIFICATE OF CORRECTION

PATENT NO. : 9,520,954 B1
APPLICATION NO. : 15/009309
DATED : December 13, 2016
INVENTOR(S) : Verspecht et al.

It is certified that error appears in the above-identified patent and that said Letters Patent is hereby corrected as shown below:

On the Title Page

Item (72) Inventor is corrected to read:
-- Jan Verspecht, Londerzeel (BE);
Keith F. Anderson, Santa Rosa (CA);
Troels Studsgaard Nielsen, Aalborg (DK) --.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*